US005454652A

United States Patent [19]

Huellemeier et al.

[11] Patent Number: 5,454,652
[45] Date of Patent: Oct. 3, 1995

[54] ADJUSTABLE KEYBOARD

[75] Inventors: John M. Huellemeier, Georgetown; Charles H. Lingle, Nicholasville; Kenneth H. Mimlitch; Edward E. Pollard, both of Lexington; Raymond H. Reichenbach, Jr., Salvisa, all of Ky.

[73] Assignee: Lexmark International, Inc., Greenwich, Conn.

[21] Appl. No.: 151,432

[22] Filed: Nov. 12, 1993

[51] Int. Cl.⁶ .......................................................... B41J 5/10
[52] U.S. Cl. ........................................... 400/489; 400/472
[58] Field of Search .................... 400/681, 682, 400/82, 472, 473, 486, 489, 492; 345/168, 169; 235/145 R, 146

[56] References Cited

U.S. PATENT DOCUMENTS

| D. 314,205 | 1/1991 | Lang et al. | D18/1 |
|---|---|---|---|
| 1,138,474 | 5/1915 | Heidner . | |
| 1,652,464 | 12/1927 | Tyberg . | |
| 3,698,532 | 10/1972 | Dodds | 197/100 |
| 3,940,758 | 2/1976 | Margolin | 340/337 |
| 3,990,565 | 11/1976 | Felton et al. | 197/98 |
| 4,081,068 | 3/1978 | Zapp | 197/98 |
| 4,378,553 | 3/1983 | McCall | 340/365 R |
| 4,402,624 | 9/1983 | Stahl et al. | 400/681 |
| 4,509,873 | 4/1985 | Ryan | 400/489 |
| 4,597,681 | 7/1986 | Hodges | 400/488 |
| 4,661,005 | 4/1987 | Lahr | 400/489 |
| 4,739,451 | 4/1988 | Kuba | 361/394 |
| 5,067,834 | 11/1991 | Szmanda et al. | 400/489 |
| 5,073,050 | 12/1991 | Andrews | 400/82 |
| 5,112,020 | 5/1992 | Ginsberg | 248/456 |
| 5,122,786 | 6/1992 | Rader | 340/711 |
| 5,137,384 | 8/1992 | Spencer et al. | 400/489 |
| 5,178,477 | 1/1993 | Gambaro | 400/489 |
| 5,198,991 | 3/1993 | Pollitt | 364/708 |
| 5,228,791 | 7/1993 | Fort | 400/489 |

FOREIGN PATENT DOCUMENTS

| 4108096 | 9/1992 | Germany | 400/472 |
|---|---|---|---|
| 9301054 | 1/1993 | WIPO | 400/489 |

OTHER PUBLICATIONS

International Publication No. WO 92/00851, Publication Date Jan. 23, 1992, PCT Applicant–M. Goldstein.
IBM Technical Disclosure Bulletin vol. 25, No. 6, Nov. 1982, Thorpe.
IBM Technical Disclosure Bulletin vol. 24, No. 12 May 1982, Kelley et al.

Primary Examiner—Ren Yan
Attorney, Agent, or Firm—Frank C. Leach, Jr.

[57] ABSTRACT

A keyboard has two segments connected to each other at their rear ends by a connector. The two segments can be pivoted about the connector through 90° in the plane of a support surface for the keyboard. In one embodiment, each keyboard segment may be disposed at a maximum angle of 45° to its support surface in a plane perpendicular to its support surface. Thus, the two segments may be tilted 90° with respect to each other. The two segments may be separated and supported individually through three pivotally mounted supports on its bottom surface. Two of the supports are disposed adjacent the rear corners and pivot on the same axis while the third support is disposed adjacent a lower inner corner of the segment and pivots on an axis perpendicular to the pivot axis of the other two supports. Each of the supports has two legs of different lengths to permit various tilting configurations of each segment with one of the legs having an adjustable length in one embodiment.

30 Claims, 19 Drawing Sheets

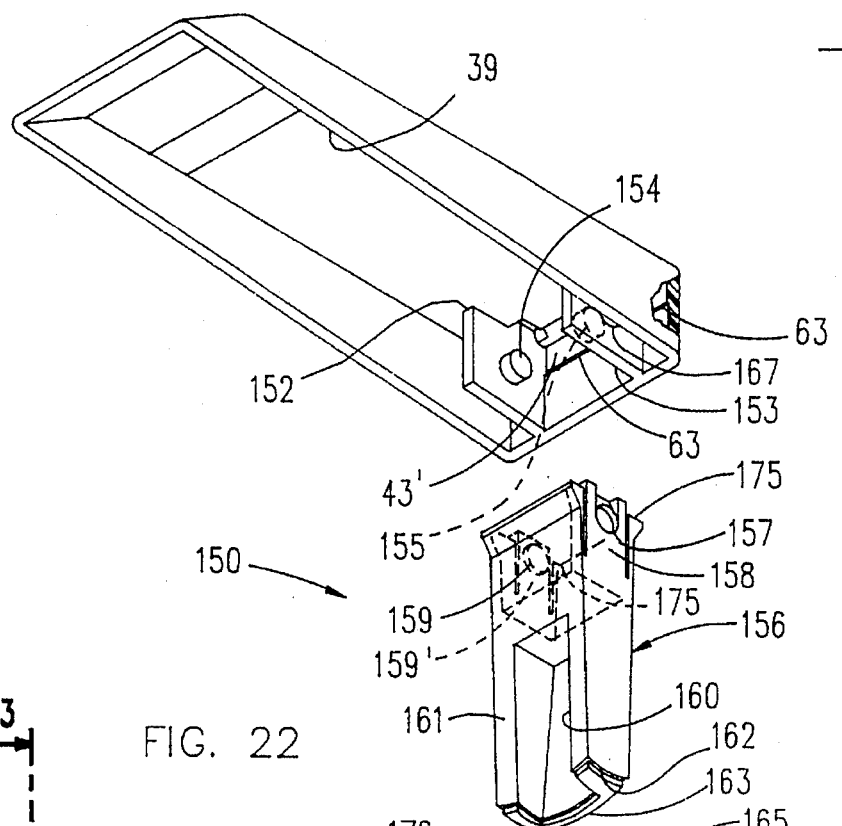
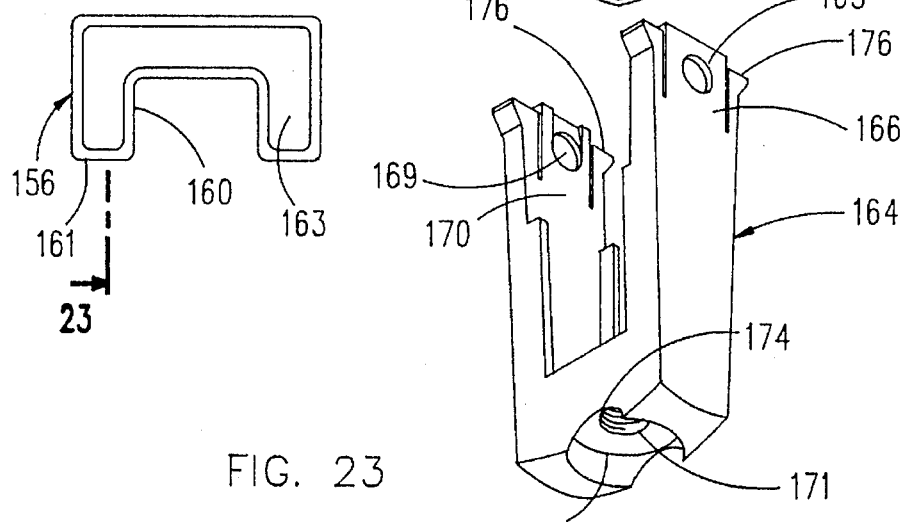
FIG. 21
FIG. 22
FIG. 23
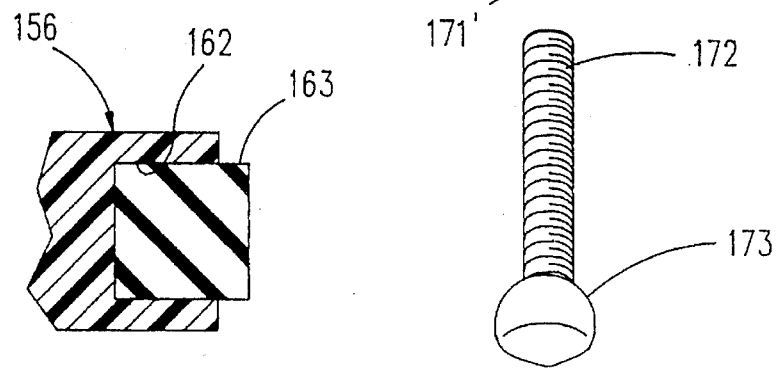

ADJUSTABLE KEYBOARD

FIELD OF THE INVENTION

This invention relates to an adjustable keyboard and, more particularly, to an adjustable keyboard having a separable pivot connection between two separate segments or sections of the keyboard.

BACKGROUND OF THE INVENTION

Various arrangements of keyboards to permit variable positioning of a user's hands have previously been suggested. These include the keyboards disclosed in the international PCT application of Goldstein (international publication number WO 92/00851) and U.S. Pat. Nos. 4,597,681 to Hodges, 5,067,834 to Szmanda et al, 5,122,786 to Rader, and 5,228,791 to Fort, for example.

The aforesaid Goldstein application discloses a keyboard having two segments or sections of different sizes connected to each other at their upper ends by a hinge, which may be a ball and socket joint. The aforesaid Goldstein application lacks any suggestion of holding the two segments in their adjusted positions when connected to each other. The aforesaid Goldstein application also has no teaching of holding the two segments, when detached from each other, at different positions with respect to a support surface such as a desk top, for example. The aforesaid Goldstein application has its space bar on its right segment terminate at the location of the character N key. A touch typist normally uses the thumb of the right hand to actuate the space bar, and the locations of the fingers of the right hand result in the thumb engaging the space bar to the left of the character N key. Thus, the right segment of the aforesaid Goldstein application would require a touch typist to change the way the space bar is struck or have difficulty in striking it.

The aforesaid Hodges patent requires a pair of base plates to be hingedly attached to each other with each of the base plates having a keyboard section pivotally connected thereto. This is a complicated arrangement that significantly increases the cost. The two sections also are not separable from each other so that the amount of relative movement between the two sections is significantly limited. Additionally, the right keyboard section does not have the space bar extending beyond the character N key in the same manner as the aforesaid Goldstein application.

The aforesaid Szmanda et al patent has a keyboard formed of two segments connected at their upper ends by a ball and socket connector and each of its segments supported on a telescoping support, which is universally connected by a ball and socket joint to a sliding attachment unit. This arrangement is both complicated and expensive. Furthermore, the space bar appears to terminate beneath the character N key. Additionally, the keys appear to have a rectangular configuration rather than having a standard keyboard arrangement in which keys in adjacent rows do not vertically align but are slightly shifted or staggered. This presents the problem to a touch typist of not being able to reach the keys properly because of the shifting of their positions from the standard keyboard arrangement.

The aforesaid Rader patent discloses two keypads with one being substantially larger than the other. The two keypads, which are mounted on separate support posts, also may be hingedly connected to each other. The aforesaid Rader patent does not have a standard keyboard arrangement or a standard space bar.

The Fort patent has a keyboard formed of two segments with each segment being separately mounted on a support through a ball and socket joint. The right segment of the keyboard has a space bar positioned to extend beyond the character N key. However, a separate support for the two joints is required to enable the two segments to be disposed adjacent each other. This is a relatively expensive keyboard.

SUMMARY OF THE INVENTION

The present invention satisfactorily solves the foregoing problems through having a keyboard formed of two segments or sections in which the two segments can be rotated a maximum of 90° from each other in a horizontal (X–Y) plane, which is the plane of a support surface for the keyboard. In one embodiment, the two segments of the keyboard are locked in any position to which they are moved through a connector. In this embodiment, the connector is formed so that each of the two segments also can be tilted a maximum of 45° relative to the support surface in a vertical plane, which is perpendicular to the plane of the support surface.

The connector of the present invention also enables the separation of the two keyboard segments. Of course, the two segments can be held adjacent each other by the connector to form a standard keyboard arrangement.

Another embodiment has a connector in which the two segments are not locked to each other. This connector permits separation of the two segments while allowing movement of the two segments to change their slope and tilt angles.

Each of the two keyboard segments also has three pivotally mounted supports on its bottom. These supports enable each of the segments to be supported at different slope (front to rear) and tilt (right to left for left segment and left to right for right segment) angles with respect to the support surface.

The pivotally mounted supports have two pivotally mounted legs of different lengths. One embodiment has an extension on the longer leg to provide for larger slope and tilt angles.

The two keyboard segments also are shaped so that the right hand segment has its space bar extending to the left beyond the character N key. Therefore, a touch typist can activate the space bar without any change in technique.

An object of this invention is to provide a keyboard having two segments or sections with each being movable to various positions while connected to the other and being capable of being separated from each other and movable to various positions independently of the other.

Another object of this invention is to provide keyboard segments having supports for supporting each segment or section at desired slope and tilt angle positions, particularly when separated from each other but also when connected to each other.

A further object of this invention is to provide a keyboard having two segments or sections connected to each other by a connector allowing movement of each segment or section relative to the other in two substantially perpendicular planes while retaining the two segments in any position to which each is moved.

Still another object of this invention is to provide a connector having a first portion that may be deployed in a different position relative to a second portion to increase the torque for locking the two keyboard segments in their desired positions.

Other objects of this invention will be readily perceived from the following description, claims, and drawings.

BRIEF DESCRIPTION OF THE DRAWINGS

In the drawings:

FIG. 21 is a an exploded perspective view of another embodiment of a support pivotally mounted on the bottom of each of the segments of the keyboard.

FIG. 22 is an end elevational view of a short leg of the support of FIG. 21.

FIG. 23 is a sectional view of the short leg of FIG. 22 and taken along line 23—23 of FIG. 22.

DETAILED DESCRIPTION

Figure 1:
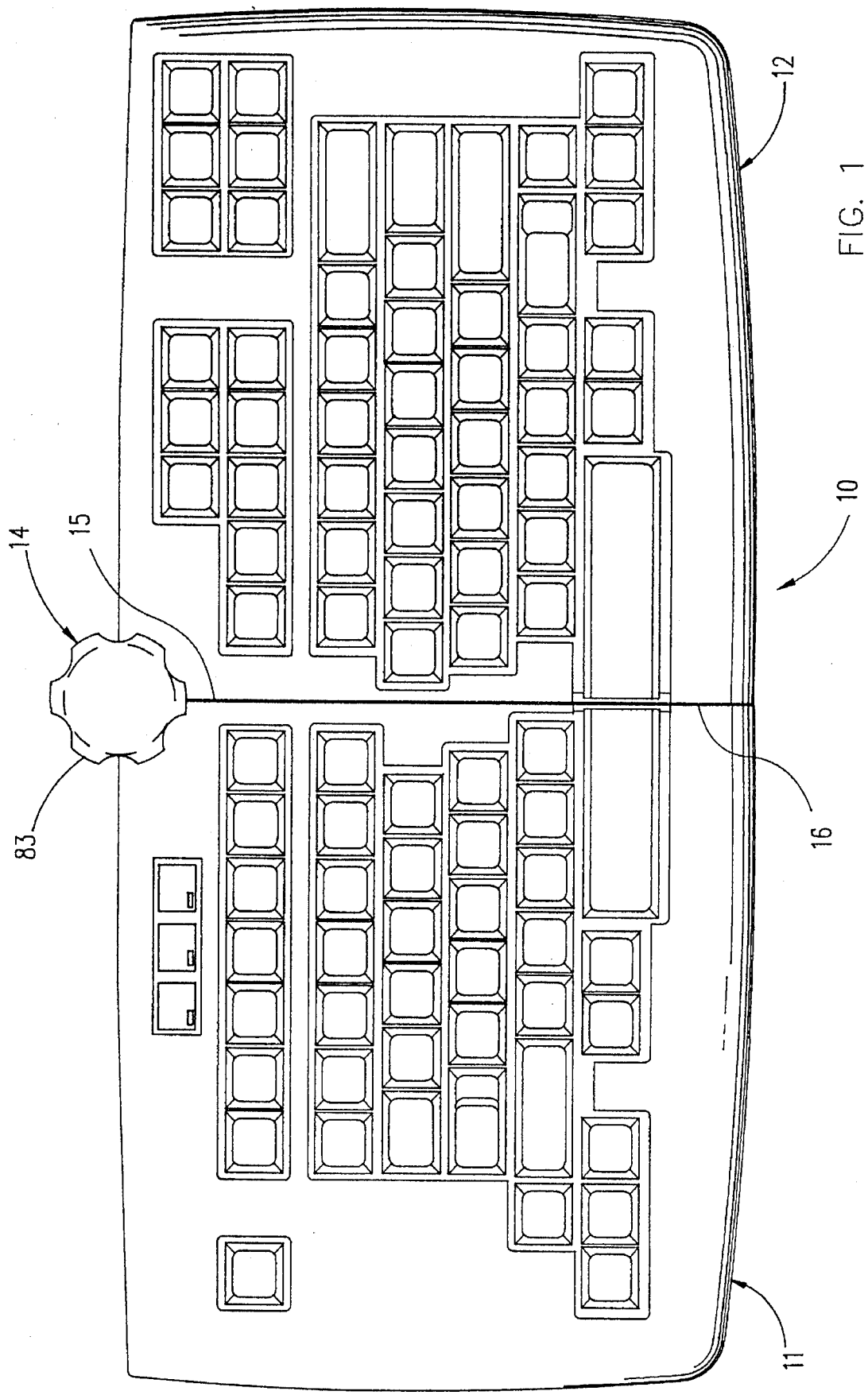
FIG. 1 is a top plan view of a keyboard of the present invention having the two segments in abutting relation.
Figure 2:
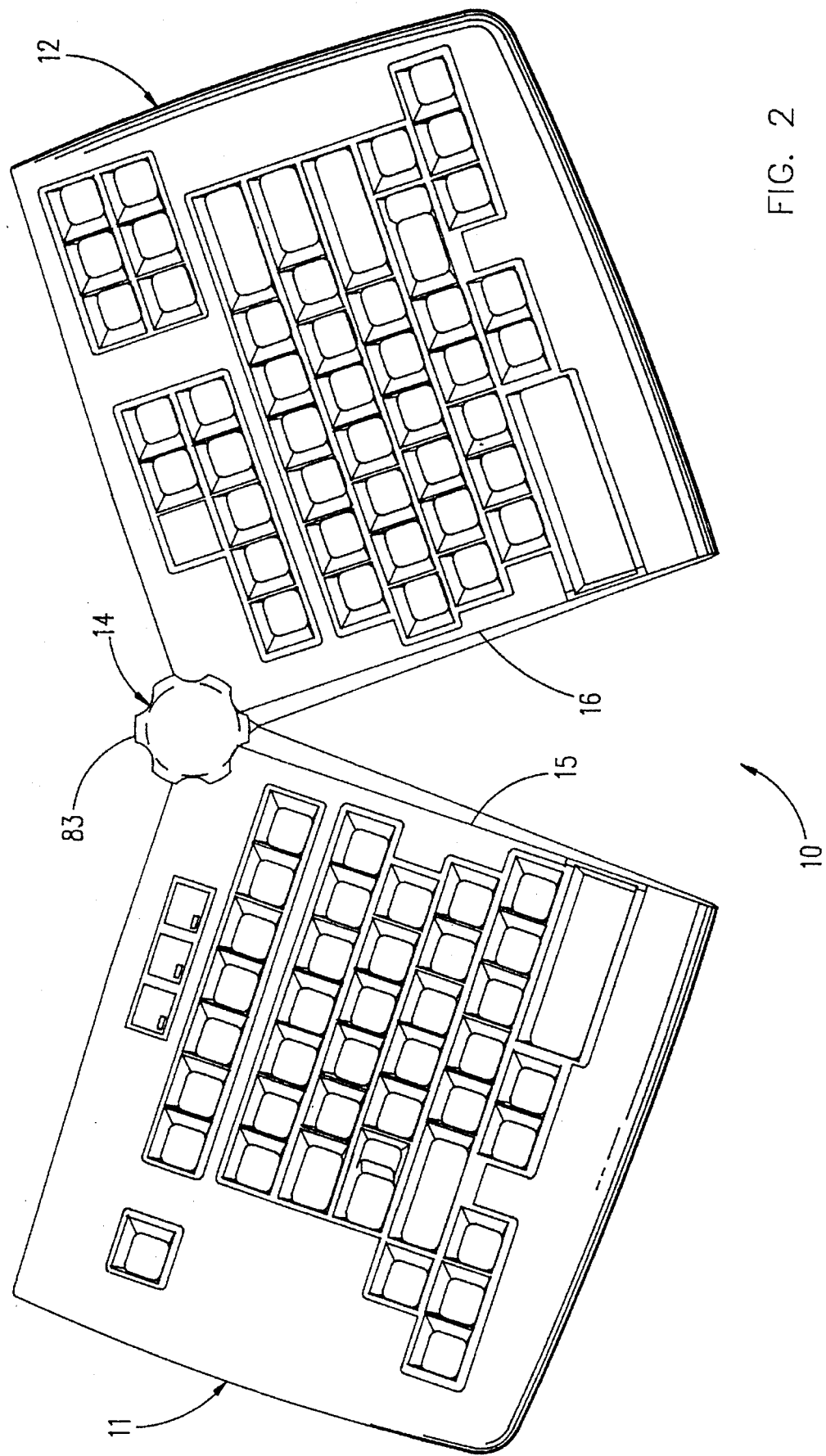
FIG. 2 is a top plan view of the keyboard of FIG. 1 with the two segments pivoted away from each other in a horizontal plane and each of the segments having a tilt angle of 20° to the horizontal plane.

Referring to the drawings and particularly FIG. 1, there is shown a keyboard 10 having a left segment or section 11 and a right segment or section 12. A connector 14 connects the segments 11 and 12 to each other at their rear ends so that a straight surface 15 on the left segment 11 can abut a straight surface 16 on the segment 12. The connector 14 locks the segments 11 and 12 in the abutting relation of FIG. 1.

Figure 3:
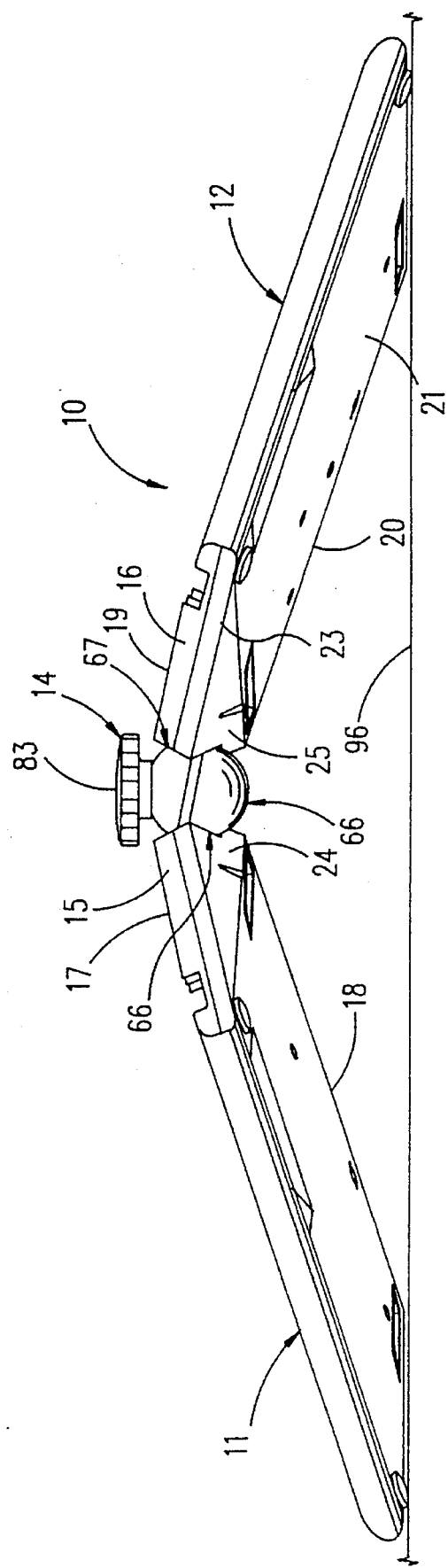
FIG. 3 is a front elevational view of the keyboard of FIG. 2.

The left segment 11 includes a top 17 (see FIG. 3) and a bottom 18. The right segment 12 includes a top 19 and a bottom 20. Each of the top 17 of the left segment 11, the bottom 18 of the left segment 11, the top 19 of the right segment 12, and the bottom 20 of the right segment 12 is formed of a suitable plastic.

Figure 17:
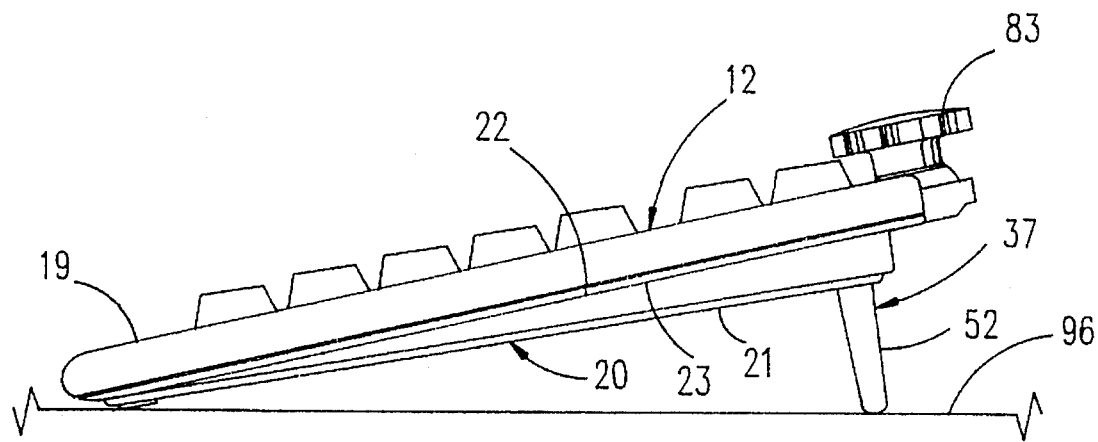
FIG. 17 is a right side elevational view of the keyboard of FIG. 1 showing one of the slope positions produced by the support of FIG. 15.

As shown in FIG. 17, the bottom 20 of the right segment 12 has its bottom surface 21 formed at an angle of 5° to its upper surface 22. The upper surface 22 of the bottom 20 of the right segment 12 engages a bottom surface 23 (see FIG. 3) of the top 19 of the right segment 12 when the top 19 and the bottom 20 are secured to each other by screws. When the bottom surface 21 rests on a support surface, the rear end of the right segment 12 is elevated 5° with respect to its front end.

The bottom 18 of the left segment 11 is formed in the same manner as the bottom 20 of the right segment 12. Likewise, the top 17 of the left segment 11 is formed in the same manner as the top 19 of the right segment 12. The rear end of the left segment 11 is elevated 5° with respect to its front end in the same manner as the right segment 12.

The bottom 18 of the left segment 11 has its side surface 24, which is closest to the right segment 12, beveled at an angle of 45°. The bottom 20 of the right segment 12 has its side surface 25 beveled at an angle of 45°. This permits tilting of either of the segments 11 and 12 of the keyboard 10 when the surface 15 of the left segment 11 and the surface 16 of the right segment 12 are in abutting relation as shown in FIG. 1. Without the side surfaces 24 (see FIG. 3) and 25 being beveled, tilting of the left segment 11 or the right segment 12 could not occur.

Figure 4:
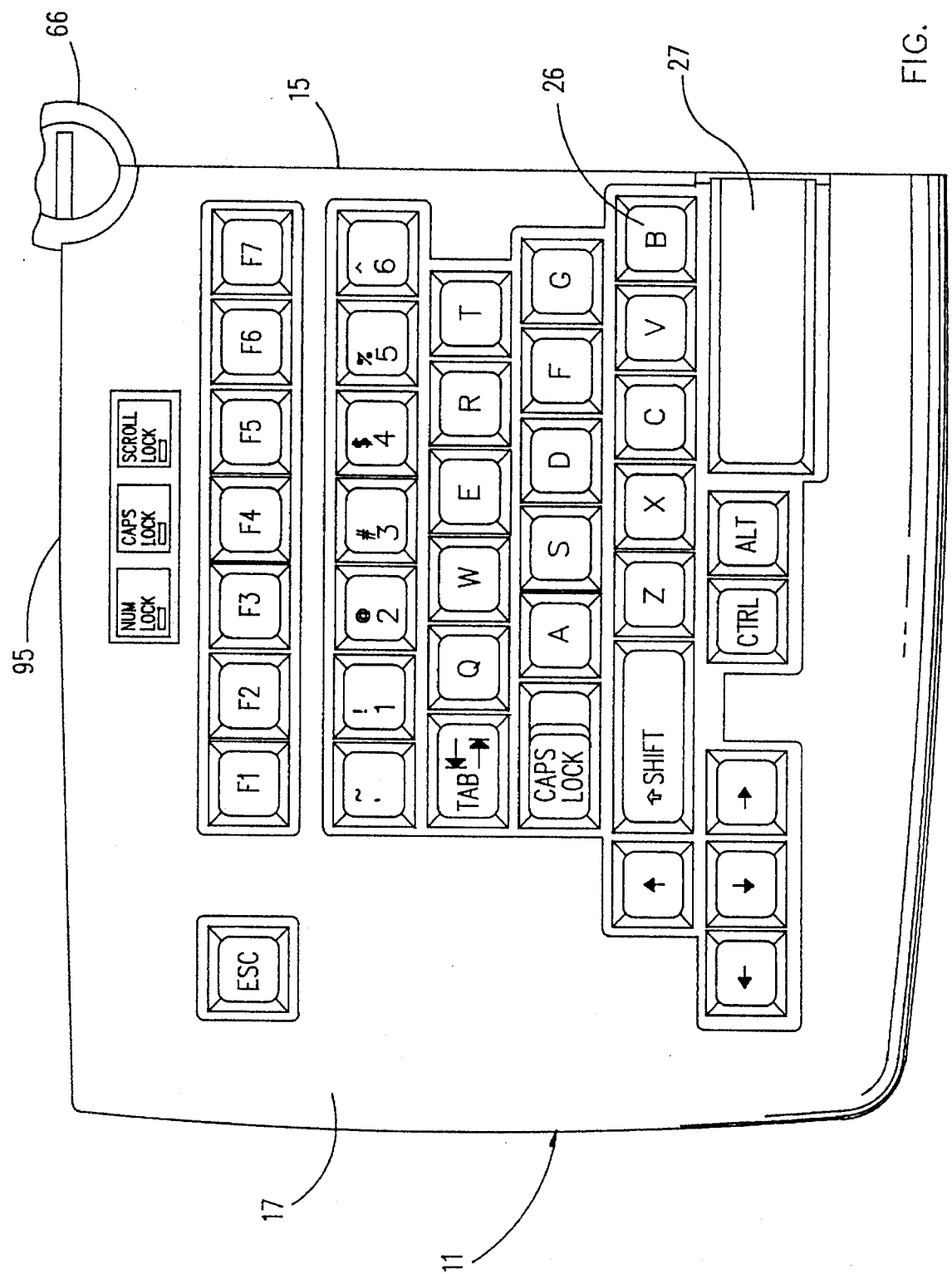
FIG. 4 is an enlarged top plan view of the left segment of the keyboard of FIG. 1 showing each key with its character.

As shown in FIG. 4, the left segment 11 has a plurality of keys 26 and a space bar 27. Similarly, as shown in FIG. 5, the right segment 12 has a plurality of keys 28 and a space bar 29.

Figure 5:
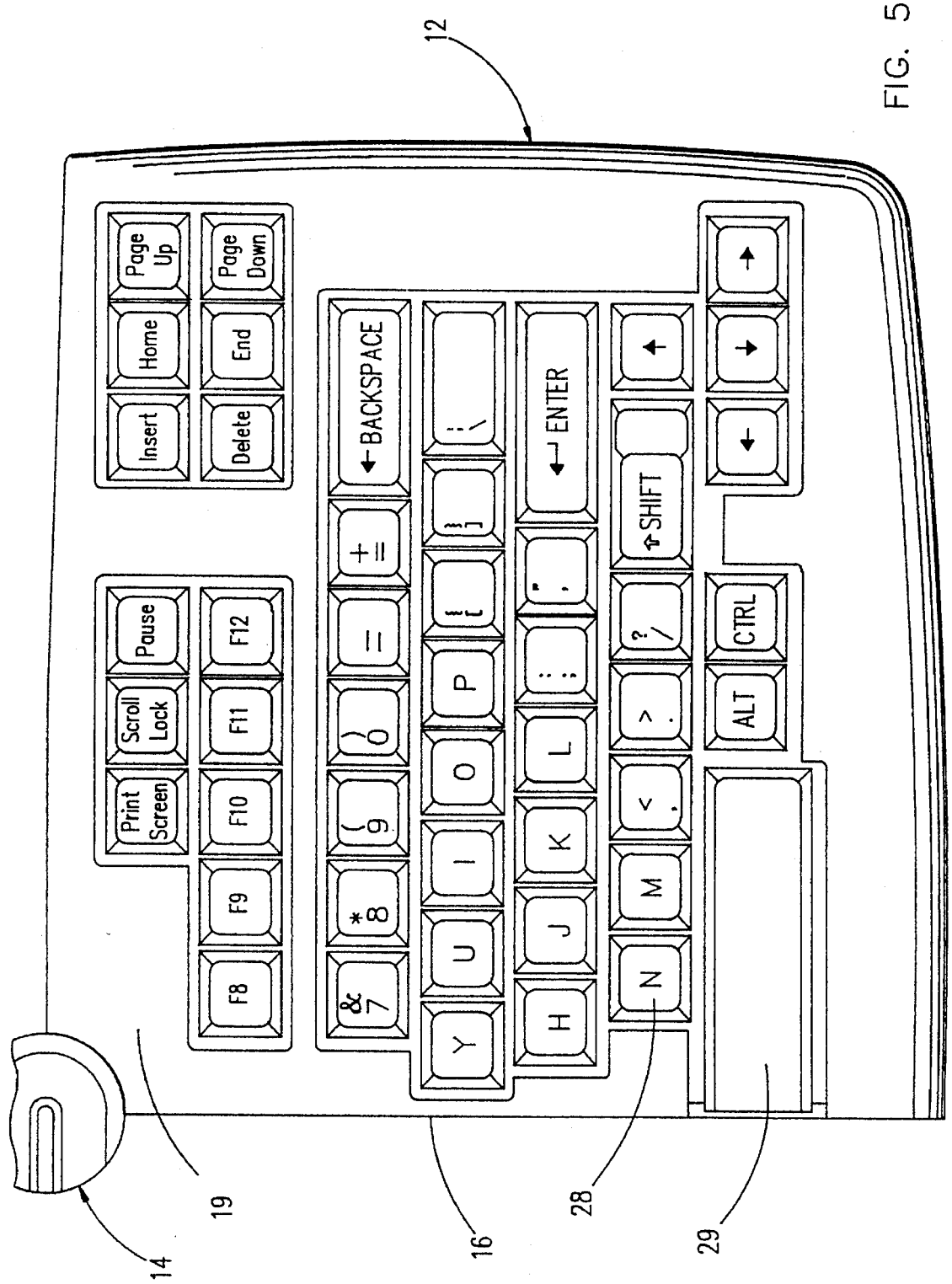
FIG. 5 is an enlarged top plan view of the right segment of the keyboard of FIG. 1 showing each key with its character.

As shown in FIG. 5, the space bar 29 extends beyond the character N key 28. This extension of the space bar 29 beyond the character N key 28 enables a touch typist to be able to activate the space bar 29 without having to change technique.

The bottom 18 (see FIG. 6) of the left segment 11 has three recesses 35 in its bottom surface 36. Each of the recesses 35 has a pivotally mounted support 37 (only one shown) disposed therein. Each of the pivotally mounted supports 37 is disposed within one of the recesses 35 so that it does not extend beyond the bottom surface 36 when in its inoperative or rest position.

Two of the three pivotally mounted supports 37 pivot about the same pivot axis. These two pivotally mounted supports 37 are disposed at the rear end of the left segment 11 when the left segment 11 (see FIG. 4) is positioned with the keys 26 accessible.

The third of the three pivotally mounted supports 37 (see FIG. 6) has its pivot axis substantially perpendicular to the pivot axis of the other two pivotally mounted supports 37. The third pivotally mounted support 37 is in the corner of the front end of the left segment 11 closest to the right segment 12 (see FIG. 1) when the left segment 11 (see FIG. 4) is positioned with the keys 26 accessible.

The bottom surface 36 (see FIG. 6) has a rubber pad 38 adjacent each of the four corners of the bottom 18 of the left segment 11 to support the left segment 11 on a support surface. Accordingly, only the four rubber pads 38 contact the support surface when the supports 37 are in their rest positions.

Figure 6:
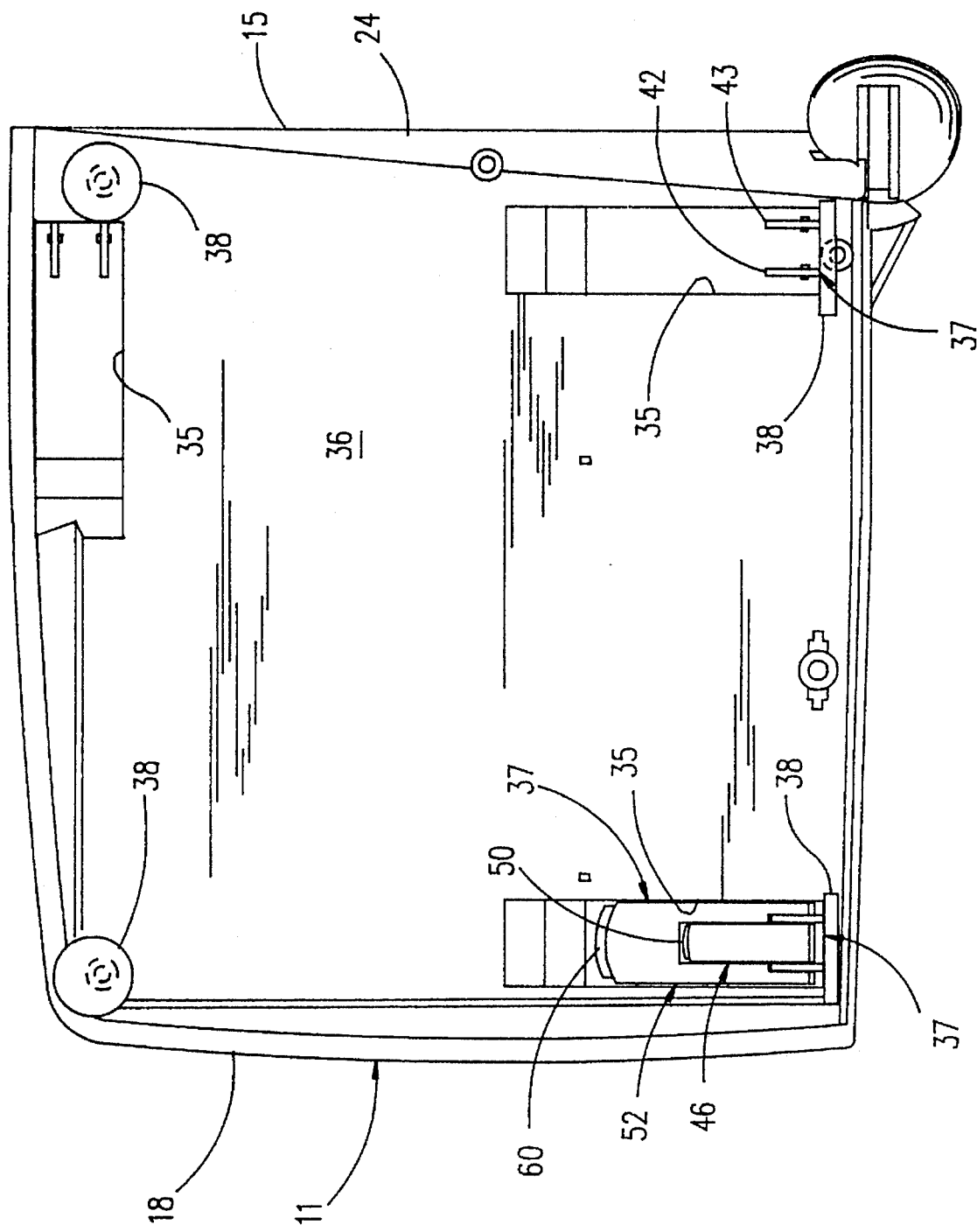
FIG. 6 is a bottom plan view of the left segment of the keyboard of FIG. 1.

With the pivotally mounted supports 37 in their rest positions within the recesses 35, the top 17 (see FIG. 3) is disposed at a slope angle of 5° from front to rear when the left segment 11 is positioned on a support surface and supported by the rubber pads 38 (see FIG. 6). This angle of 5° is produced by the bottom surface 36 being at an angle of 5° to the top 17 (see FIG. 3) of the left segment 11.

The bottom surface 21 (see FIG. 7) of the bottom 20 of the right segment 12 has three recesses 39. Each of the recesses 39 has one of the pivotally mounted supports 37 (only one shown) disposed therein. Each of the pivotally mounted supports 37 is disposed within one of the recesses 39 so that it does not extend beyond the bottom surface 21 when in its inoperative or rest position.

Two of the three pivotally mounted supports 37 pivot about the same pivot axis. These two pivotally mounted supports 37 are disposed in the two corners at the rear end of the right segment 12 when the right segment 12 is positioned with the keys 28 (see FIG. 5) accessible.

The third of the three pivotally mounted supports 37 (see FIG. 7) has its pivot axis substantially perpendicular to the pivot axis of the other two of the pivotally mounted supports 37. The third pivotally mounted support 37 is in the corner at the front end of the right segment 12 closest to the left segment 11 (see FIG. 1) when the right segment 12 is positioned with the keys 28 (see FIG. 5) accessible as previously mentioned.

The bottom surface 21 (see FIG. 7) has a rubber pad 40 adjacent each of the four corners of the bottom 20 of the right segment 12 to support the right segment 12 on a support surface. Accordingly, only the rubber pads 40 contact the support surface when the supports 37 are in their rest positions.

Figure 7:
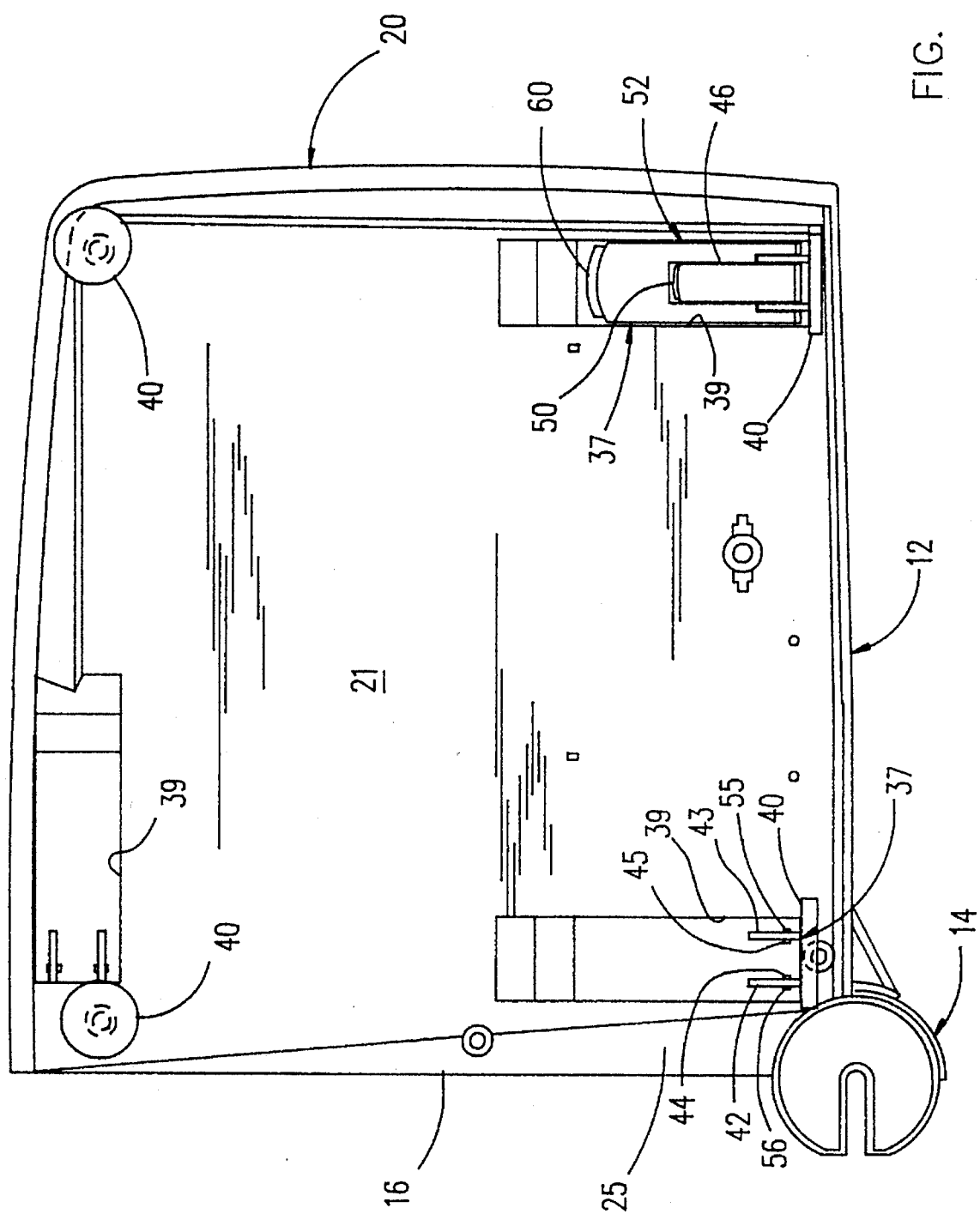
FIG. 7 is a bottom plan view of the right segment of the keyboard of FIG. 1.

With the pivotally mounted supports 37 in their rest positions within the recesses 39, the top 19 (see FIG. 3) is disposed at a slope angle of 5° from front to rear when the right segment 12 is positioned on a support surface and supported by the rubber pads 40 (see FIG. 7). This angle of 5° is produced by the bottom surface 21 being at an angle of 5° to the top 19 (see FIG. 3) of the right segment 12 as previously mentioned.

Figure 15:
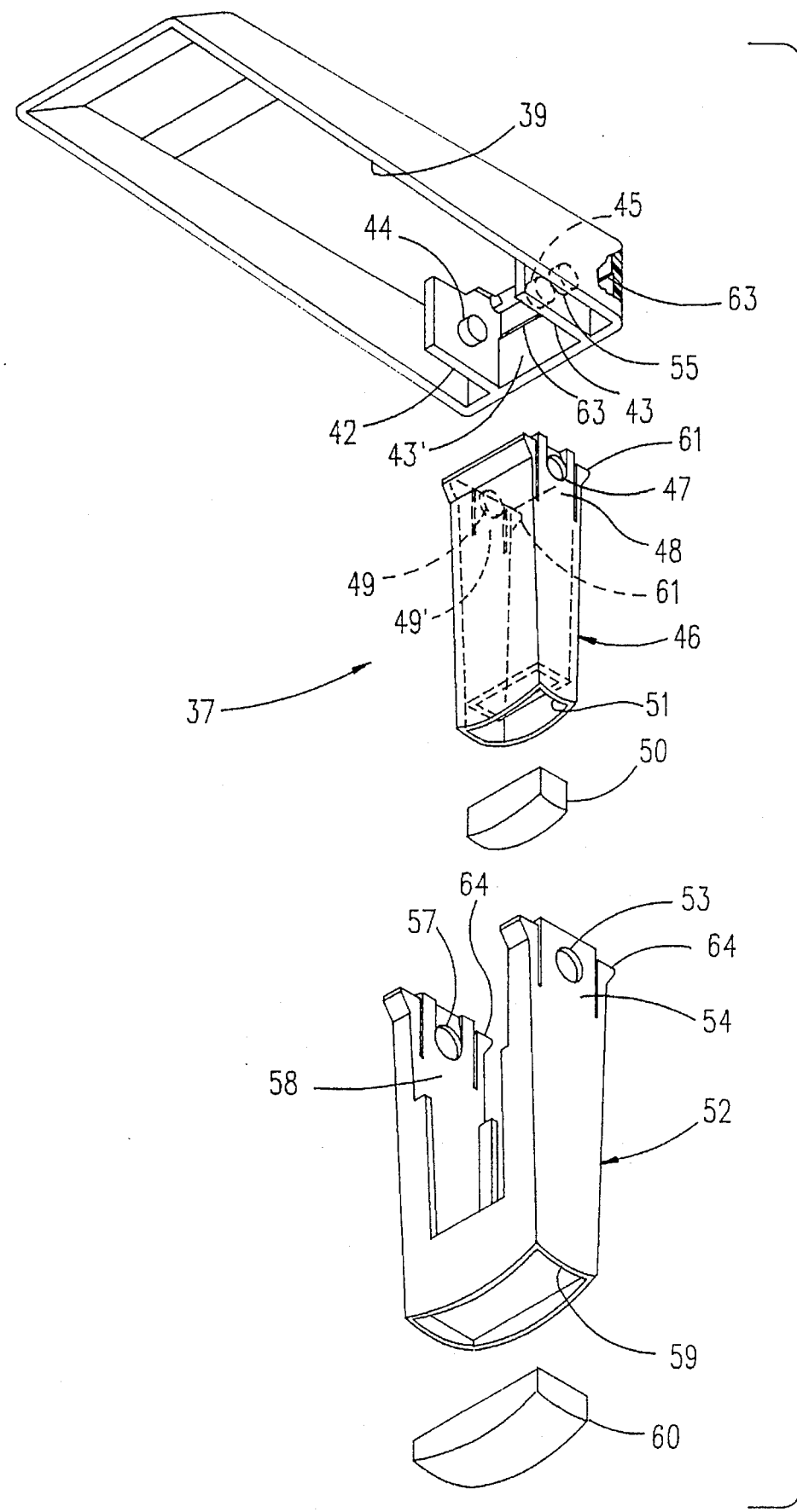
FIG. 15 is an exploded perspective view of one form of a support pivotally mounted on the bottom of each of the segments of the keyboard.

As shown in FIG. 15, each of the pivotally mounted supports 37 includes a pair of substantially parallel brackets 42 and 43 extending substantially perpendicular from a wall 43' of the recess 39. The brackets 42 and 43 have inner cylindrical studs 44 and 45, respectively, to pivotally support a short leg 46.

The pivotally mounted support 37 is shown disposed in FIG. 15 in the recess 39. However, the same pivotally mounted support 37 is disposed in each of the recesses 35 (see FIG. 6) but all reference to FIG. 15 will be to the recess 39.

The short leg 46 (see FIG. 15) has an opening 47 in a first split side 48, which is sufficiently flexible to enable the opening 47 to fit over the inner cylindrical stud 45 of the bracket 43. The short leg 46 has a second opening 49, which is similarly formed in a second split side 49', to fit over the inner cylindrical stud 44 on the bracket 42.

A rubber plug 50 fits within an opening 51 in the short leg 46 to protrude slightly beyond the short leg 46 so that only the rubber plug 50 engages the support surface. An adhesive retains the rubber plug 50 in the opening 51.

The pivotally mounted support 37 includes a long leg 52, which has the short leg 46 nested therein when the legs 46 and 52 are disposed within the recess 39. The long leg 52 has an opening 53 in a first split side 54. The opening 53 fits over an outer cylindrical stud 55 on the bracket 43. The bracket 42 has a similar outer cylindrical stud 56 (see FIG. 7) to receive an opening 57 (see FIG. 15) in a second split side 58 of the long leg 52. Thus, the long leg 52 is pivotally mounted on the same pivot axis as the short leg 46.

The long leg 52 has an opening 59 in its end to receive a rubber plug 60. The rubber plug 60 protrudes slightly beyond the end of the long leg 52 so that only the rubber plug 60 engages the support surface.

When the short leg 46 is pivoted from its rest position to its support position, a cam surface 61 on each side of the short leg 46 initially engages the wall 43' above a ledge 63 on the wall 43'. As pivoting of the short leg 46 continues, the two cam surfaces 61 spring away from the wall 43' as they pass over a central portion of the ledge 63. Then, the cam surfaces 61 engage the bottom of the central portion of the ledge 63 so that the central portion of the ledge 63 functions as a detent for the short leg 46.

When the long leg 52 is pivoted from its inoperative or rest position to its support position, a cam surface 64 on each side of the long leg 52 initially engages the vertical wall 43' above outer portions of the ledge 63. As pivoting continues, the two cam surfaces 64 spring away from the wall 43' as they pass over the outer portions of the ledge 63. Then, the cam surfaces 64 engage the bottom of each of the outer portions of the ledge 63 so that the outer portions of the ledge 63 function as a detent for the long leg 52.

Figure 8:
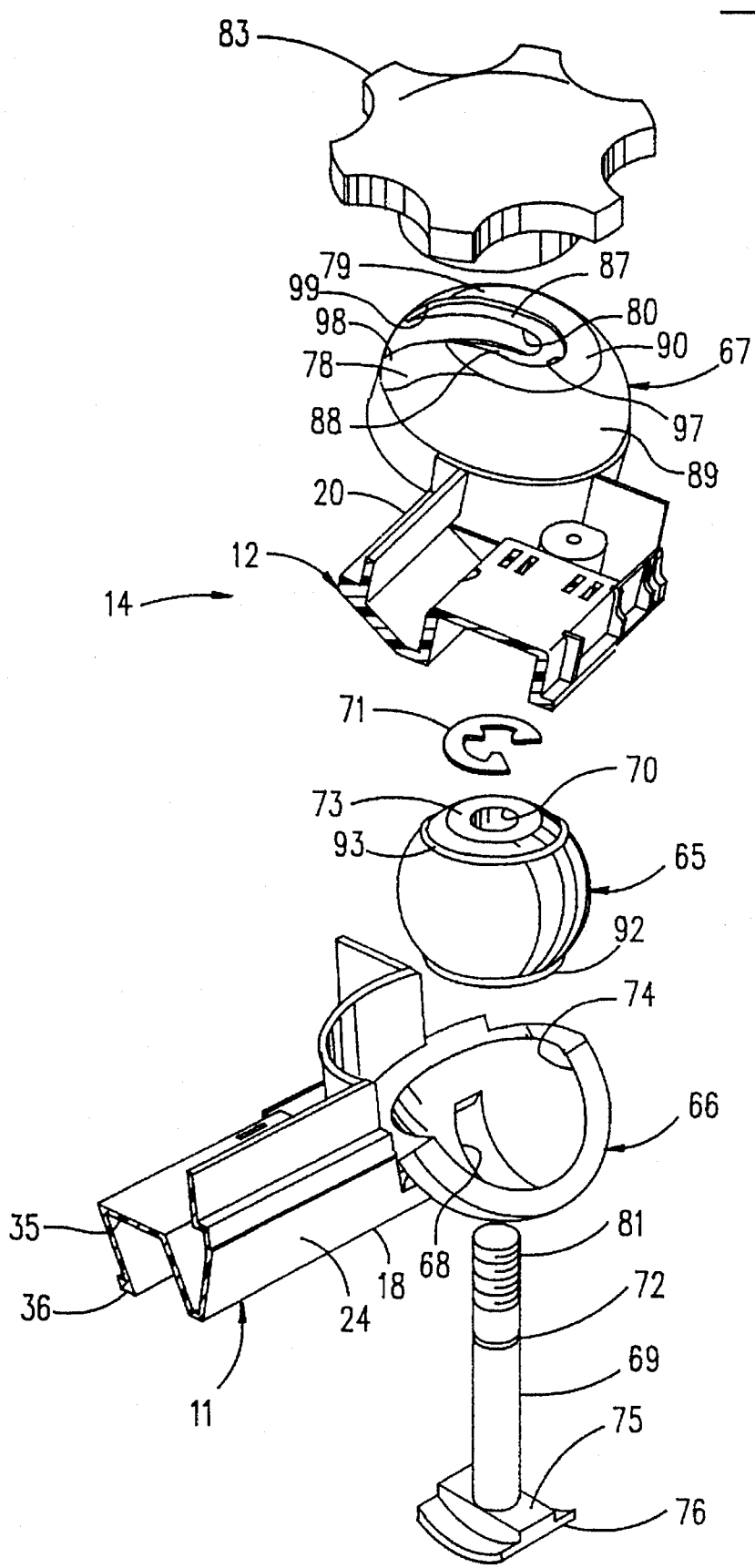
FIG. 8 is an exploded perspective view of one form of a connector connecting the two segments of the keyboard to each other and taken from the top of the connector.

As shown in FIG. 8, the connector 14 includes a ball 65, which is a sphere, positioned between a bottom socket 66 and a top or upper socket 67. The bottom socket 66 is integral with the bottom 18 of the left segment 11, and the top socket 67 is integral with the bottom 20 of the right segment 12.

The bottom socket 66 has an arcuate slot 68, which extends for 90°, formed therein to receive a shaft 69. The shaft 69 extends through a passage 70 in the ball 65 and has an E-clip 71 disposed within an annular slot 72 therein. The E-clip 71 rests against a flat surface 73 of the ball 65 to hold the bottom socket 66 with its inner spherical surface 74 slightly spaced from the ball 65.

Figure 9:
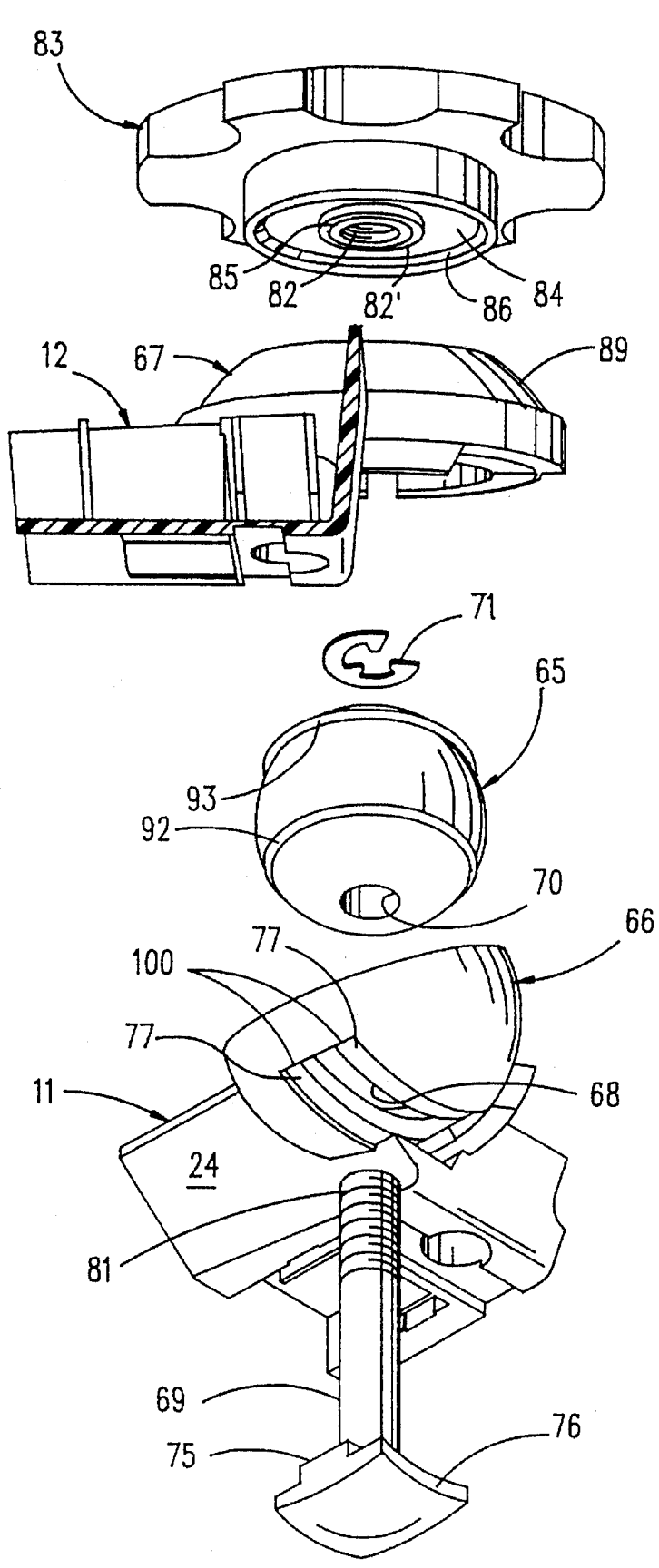
FIG. 9 is an exploded perspective view of the connector of FIG. 8 and taken from the bottom of the connector.

The shaft 69 has a reduced portion 75 disposed within the arcuate slot 68 in the bottom socket 66 when the E-clip 71 bears against the flat surface 73 in the ball 65. This results in the shaft 69 having its head 76 ride on a pair of tracks 77 (see FIG. 9) on opposite sides of the arcuate slot 68.

The upper socket 67 (see FIG. 8) includes a pair of split fingers 78 and 79 having an arcuate slot 80 therebetween to receive the shaft 69. The arcuate slot 80 extends for 90° from the top of the upper socket 67 to the ends of the fingers 78 and 79.

The shaft 69 has threads 81 on its upper end for disposition within a tapped hole 82 (see FIG. 9) in a metal insert 82' in a knob 83, which is formed of a suitable plastic. The knob 83 has a flat surface 84 with an inner hub 85 surrounding the tapped hole 82 and projecting beyond the plane of the flat surface 84. The flat surface 84 of the knob 83 has a spherical clamping surface 86 at its outer edge formed on a radius of curvature.

Figure 12:
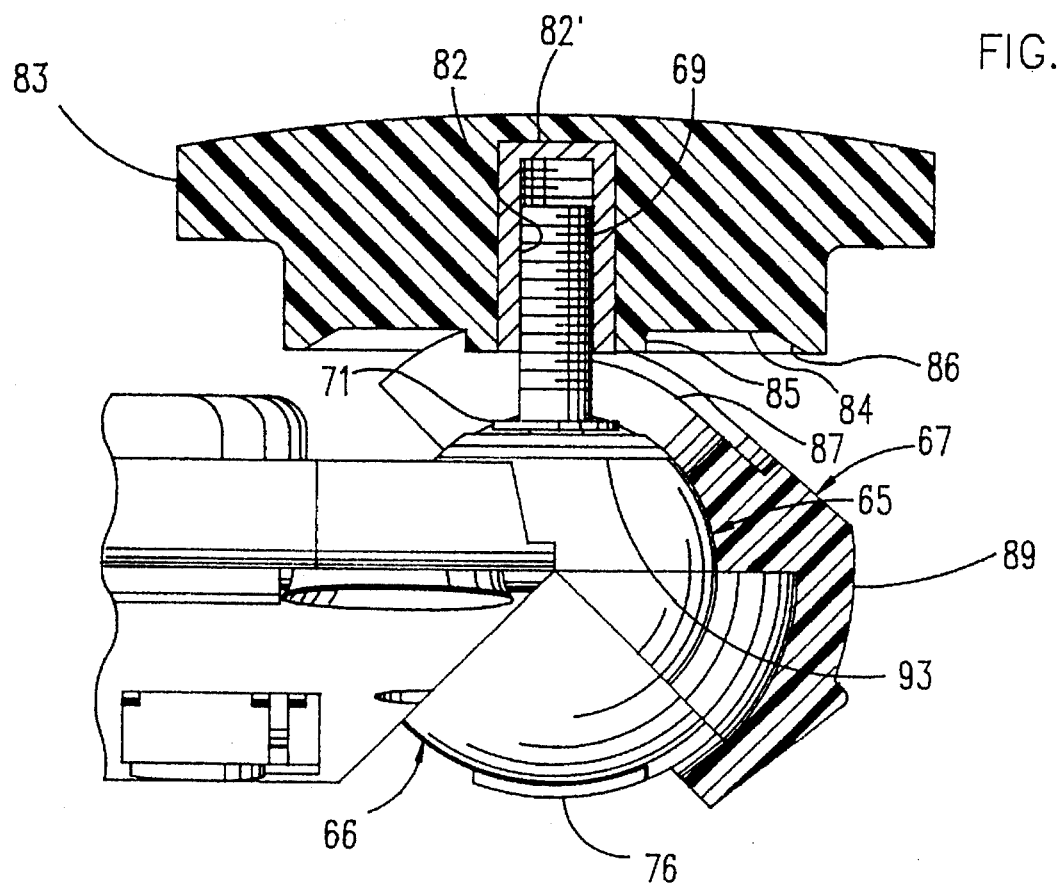
FIG. 12 is an enlarged fragmentary sectional view of a portion of the connector of FIGS. 8 and 9 and showing a knob cooperating with an upper socket when the upper socket is at its maximum tilt.

The upper socket 67 has tracks 87 (see FIG. 8) and 88 formed in its outer surface on opposite sides of the arcuate slot 80. The distance between the inner edges of the tracks 87 and 88 is selected so that the inner hub 85 (see FIG. 9) of the knob 83 fits therebetween as shown in FIG. 12. This allows the upper socket 67 to have relative movement with respect to the ball 65 in both the horizontal and vertical planes when the spherical clamping surface 86 of the knob 83 is not in clamping engagement with a spherical surface 89 of the upper socket 67. The spherical surface 89 has the same radius of curvature as the spherical clamping surface 86 of the knob 83.

Figure 14:
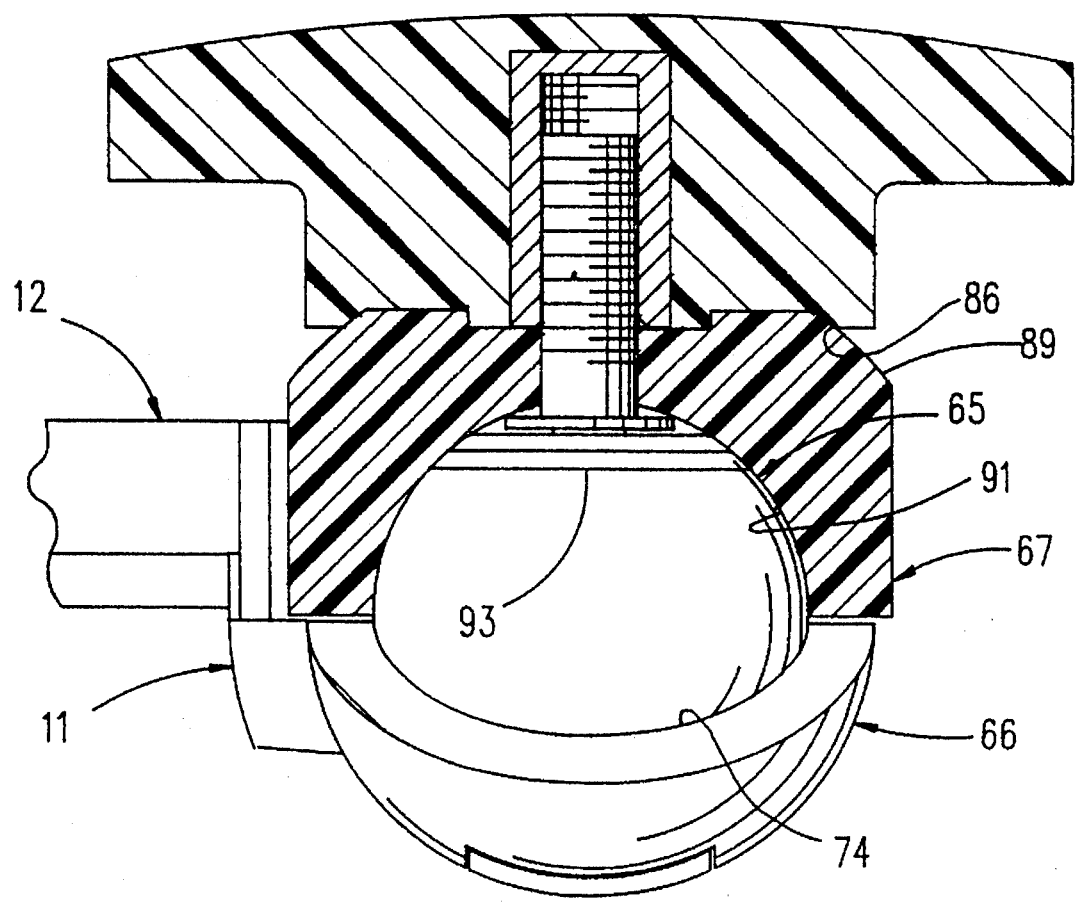
FIG. 14 is an enlarged fragmentary sectional view of the knob and the upper socket and showing the knob exerting a clamping force on the upper socket when the keyboard is in the position of FIG. 1.

When the left segment 11 (see FIG. 1) and the right segment 12 are in the position of FIG. 1 in which the surface 15 of the left segment 11 and the surface 16 of the right segment 12 abut and there is no tilting of the left segment 11 or the right segment 12, the knob 83 (see FIG. 9) has the inner hub 85 engaging a flat top surface 90 (see FIG. 8) of the upper socket 67 with the inner hub 85 (see FIG. 9) disposed between the inner edges of the tracks 87 (see FIG. 8) and 88 of the upper socket 67. With the knob 83 (see FIG. 14) tightened, the spherical clamping surface 86 of the knob 83 engages the spherical surface 89 of the upper socket 67. This results in the spherical clamping surface 86 of the knob 83 pushing against the spherical surface 89 of the upper socket 67 to prevent the fingers 78 (see FIG. 8) and 79 from spreading when they are pushed against the ball 65.

When the segments 11 (see FIG. 1) and 12 are held in the position of FIG. 1 with no tilting, the inner spherical surface 74 (see FIG. 14) of the lower socket 66 bears against the lower hemisphere of the ball 65. The upper socket 67 has its inner spherical surface 91 engaging the upper hemisphere of the ball 65.

The inner spherical surfaces 74 and 91 have a radius of curvature slightly larger than the radius of curvature of the ball 65°. For example, the diameter of the ball 65 is 25 millimeters and the diameter of each of the inner spherical surfaces 74 and 91 is 25.1 millimeters.

The ball 65 (see FIG. 8) has an O-ring 92 mounted on its outer surface in its lower hemisphere to engage the inner spherical surface 74 of the lower socket 66. The ball 65 has an O-ring 93 mounted on its outer surface in its upper hemisphere to engage the inner spherical surface 91 (see FIG. 14) of the upper socket 67. This arrangement insures that the ball 65 and the sockets 66 and 67 remain clamped so that the segments 11 and 12 remain locked in their desired positions.

Figure 10:
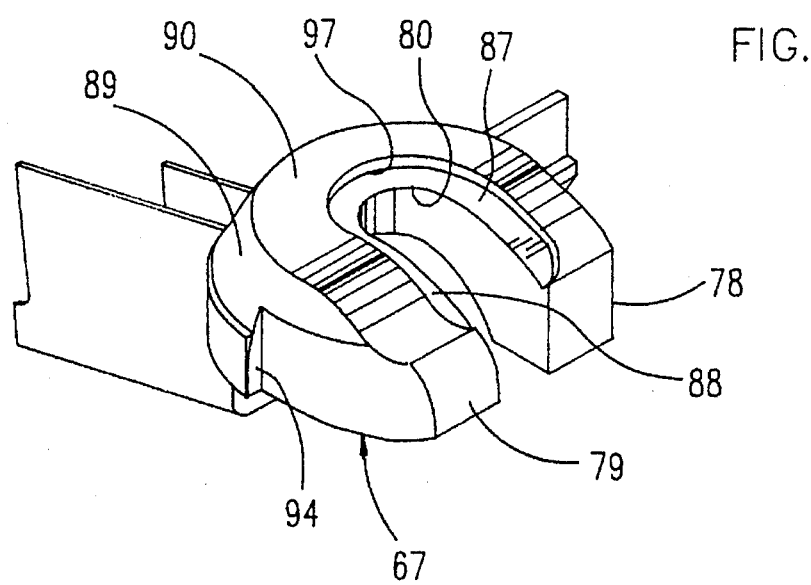
FIG. 10 is a perspective view of an upper socket of the connector of FIGS. 8 and 9.
Figure 11:
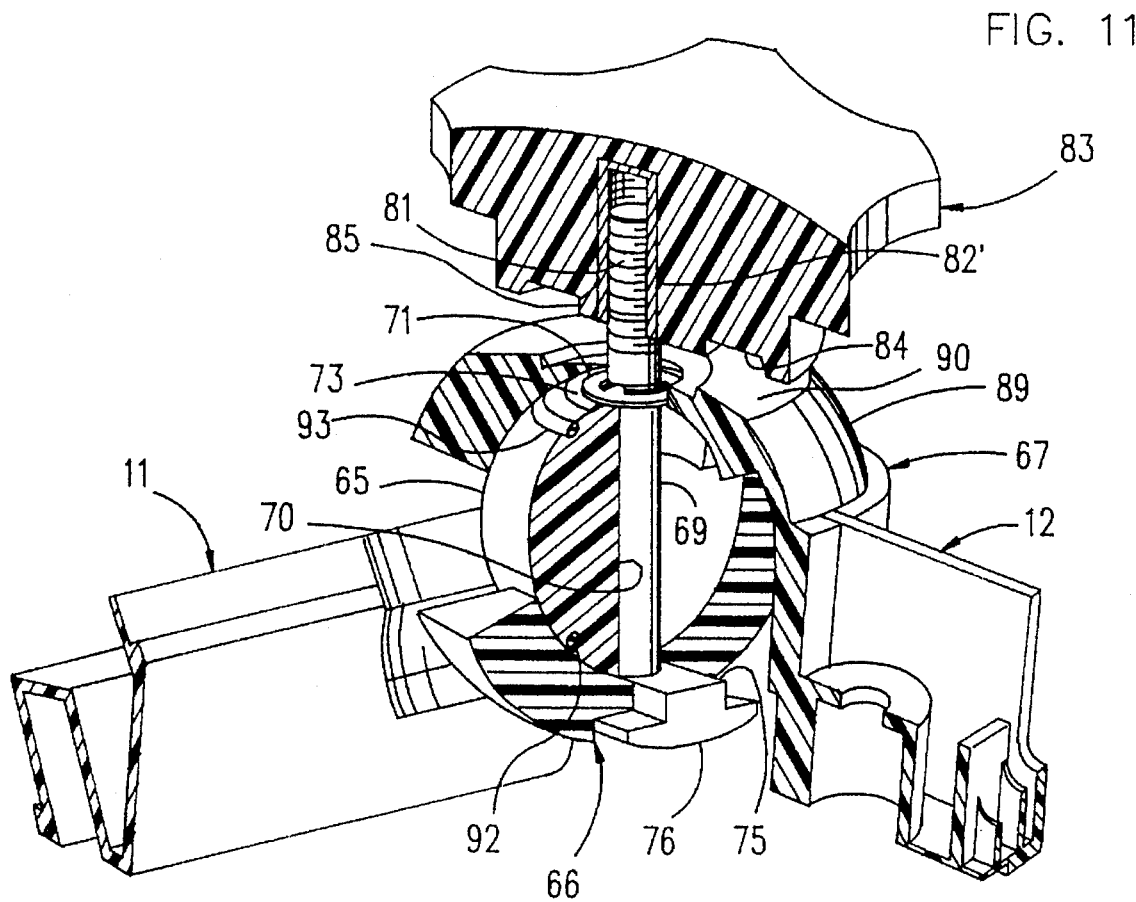
FIG. 11 is an enlarged fragmentary sectional view of the connector of FIGS. 8 and 9 when the two segments of the keyboard are in abutting relation with each other as shown in FIG. 1 and not clamped down.

The upper socket 67 has a stop 94 (see FIG. 10) engaging a rear wall 95 (see FIG. 4) of the top 17 of the left segment 11 when the left segment 11 and the right segment 12 (see FIG. 1) have been split apart 90° in the horizontal plane by rotation about the axis of the shaft 69 (see FIG. 8). This controls the maximum splitting angle of 90°.

Each of the left segment 11 (see FIG. 3) and the right segment 12 may be tilted at an angle to a support surface 96 such as a table top, for example, up to 45°. Therefore, the maximum angle between the left segment 11 and the right segment 12 when each is tilted a maximum is 90°. The tilt of each of the left segment 11 and the right segment 12 is shown at an angle of 20° to the support surface 96 in FIG. 3.

The tilting of the right segment 12 is limited by engagement of the inner hub 85 (see FIG. 9) of the knob 83 with an upper curved end 97 (see FIG. 8) of the tracks 78 and 79 or by the shaft 69 engaging the upper end of the arcuate slot 80 in the upper socket 67 depending on the tolerances. The home position of the inner hub 85 (see FIG. 9) of the knob 83 is when the right segment 12 (see FIG. 1) is in abutting relation with the left segment 11. The home position of the inner hub 85 (see FIG. 9) of the knob 83 is determined by the inner hub 85 engaging curved ends 98 (see FIG. 8) and 99 of the tracks 78 and 79, respectively. The angular distance between the home position and the maximum tilt position of the right segment 12 (see FIG. 1) is 45°.

The maximum tilt position of the left segment 11 is controlled by the head 76 (see FIG. 9) of the shaft 69 engaging ends 100 of the tracks 77 in the lower socket 66. This produces a maximum tilt of 45° from the home position of the left segment 11 (see FIG. 1) in which the head 76 (see FIG. 9) of the shaft 69 engages the ends 100 of the tracks 77 in the lower socket 66.

Figure 13:
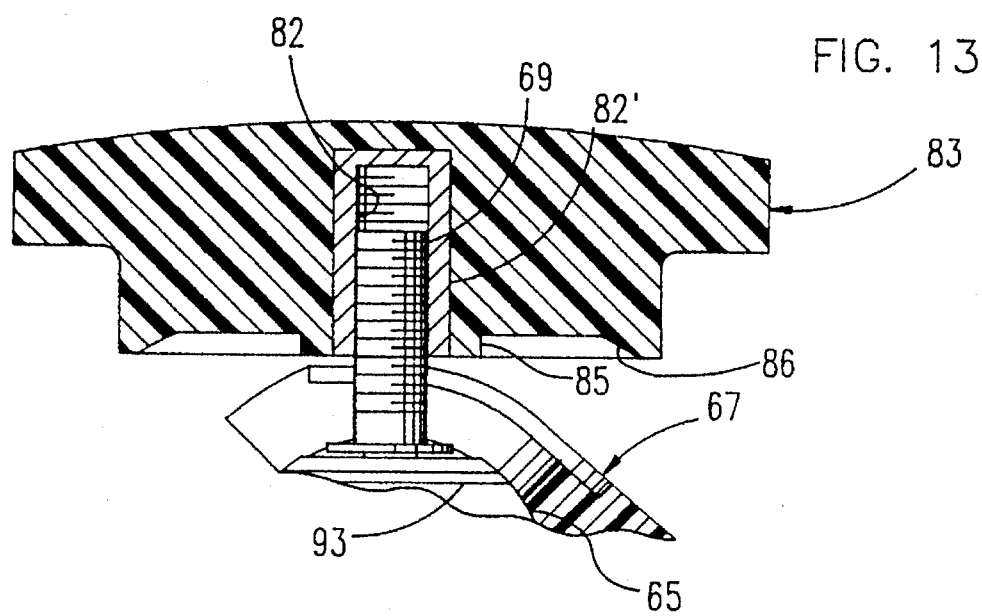
FIG. 13 is an enlarged fragmentary sectional view of the knob and the upper socket, similar to FIG. 12, but showing the knob disengaged from the upper socket.

When it is desired to separate the left segment 11 (see FIG. 1) and the right segment 12 from each other, the knob 83 (see FIG. 9) is turned so that the inner hub 85 of the knob 83 is no longer within the tracks 78 (see FIG. 8) and 79 in the upper socket 67 as clearly shown in FIG. 13. As a result, the upper socket 67 can be removed whereby the right segment 12 (see FIG. 1) is separated from the left segment 11. The knob 83 (see FIG. 13) remains engaged with the shaft 69 so that the lower socket 66 (see FIG. 8) remains connected to the knob 83.

When the left segment 11 (see FIG. 3) and the right segment 12 are tilted relative to each other, each of the segments 11 and 12 rests on the support surface 96 along its side. The two pivotally mounted supports 37 (see FIG. 7), which are at the rear of the right segment 12 when viewed from the top rather than the bottom as is FIG. 7, can be utilized. Either the short leg 46 (see FIG. 15) or the long leg 52 of each of the two pivotally mounted supports 37 can be extended, but the same length leg must be used for each of the pivotally mounted supports 37.

Figure 16:
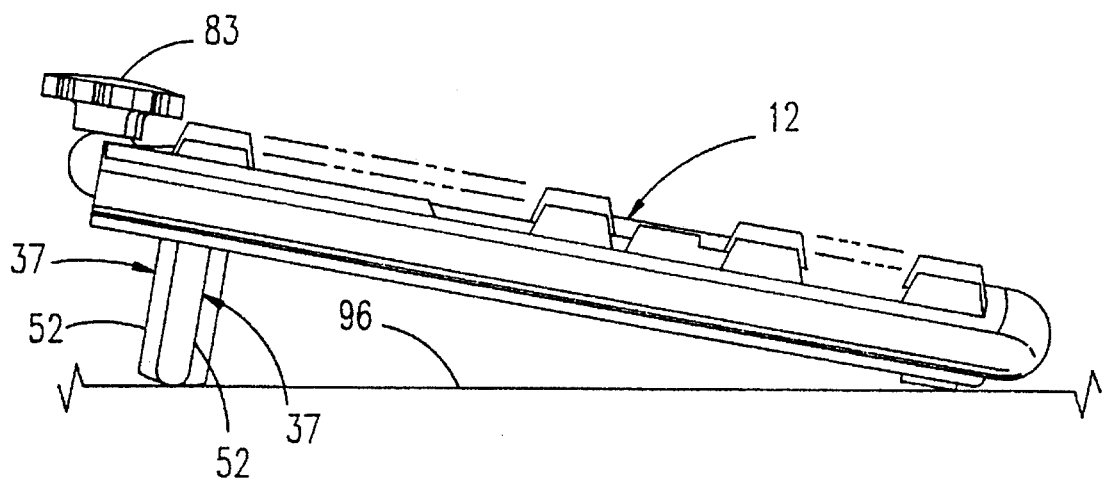
FIG. 16 is a front elevational view of the keyboard of FIG. 1 showing one of the tilt positions produced by the supports of FIG. 15.

When the left rear (as viewed from the top) pivotally mounted support 37 and the left front (as viewed from the top) pivotally mounted support 37 of the right segment 12 (see FIG. 16) have either the short legs 46 (see FIG. 15) or the long legs 52 extended, the right segment 12 (see FIG. 16) is tilted with its left side higher than its right side. When the long leg 52 (see FIG. 15) of each of the two pivotally mounted supports 37 is extended, the right segment 12 (see FIG. 16) is tilted upwardly 12°, as shown in FIG. 16, with its left (inner) side being higher than its (outer) right side. When the short legs 46 (see FIG. 15) are utilized, the right segment 12 (see FIG. 16) is tilted upwardly 6°.

The same arrangement exists for the left segment 11 (see FIG. 6) except that the right rear (as viewed from the top) pivotally mounted support 37 of the left segment 11 is used rather than the left rear pivotally mounted support 37. This is because the front (as viewed from the top) pivotally mounted support 37 of the left segment 11 is pivoted to its support position to be in alignment with the right rear pivotally mounted support 37 of the left segment 11. This causes the right (inner) side of the left segment 11 to be tilted upwardly.

Accordingly, the pivotally mounted supports 37 for the left segment 11 or the right segment 12 (see FIG. 7) cause the adjacent portions of the left segment 11 or the right segment 12 to be tilted upwardly. This can occur only when the knob 83 (see FIG. 12) is not in clamping engagement with the upper socket 67.

As shown in FIG. 17, the rear of the right segment 12 may be inclined with respect to its front through utilizing the two rear (as viewed from the top) pivotally mounted supports 37. Because of the bottom surface 21 of the bottom 20 of the right segment 12 being inclined 5° with respect to the bottom 23 of the top 19 of the right segment 12, the use of the long leg 52 (see FIG. 15) of each of the two rear pivotally mounted supports 37 causes the right segment 12 (see FIG. 17) to have its rear end inclined upwardly 17° with respect to its front end as shown in FIG. 17. If the short leg 46 (see FIG. 15) of each of the pivotally mounted supports 37 is employed, then the rear end of the right segment 12 is raised upwardly 11° with respect to its front end.

The same arrangement exists with the left segment 11 (see FIG. 1). The two rear (as viewed from the top) pivotally mounted supports 37 (see FIG. 6) of the left segment 11 are employed to raise its rear end 11° or 17° with respect to its front end.

The right segment 12 (see FIG. 7) also may be tilted through having the short leg 46 (see FIG. 15) of each of the front (as viewed from the top) pivotally mounted support 37 and the right rear (as viewed from the top) pivotally mounted support 37 on the right segment 12 (see FIG. 7) utilized and the long leg 52 (see FIG. 15) of the left rear (as viewed from the top) pivotally mounted support 37 employed. This results in the left rear (as viewed from the top) of the right segment 12 (see FIG. 7) being the highest point of the right segment 12 with the right (as viewed from the top) corner of the right segment 12 engaging the support surface 96 (see FIG. 3). A similar deployment of the legs 46 (see FIG. 15) and 52 could be employed with the left segment 11 (see FIG. 6).

The selected use of the short leg 46 (see FIG. 15) or the long leg 52 of each of at least two of the pivotally mounted supports 37 enables various tilting configurations for each of the segments 11 (see FIG. 1) and 12. These may be accomplished when the segments 11 and 12 are connected to each other or separated from each other.

Figure 18:
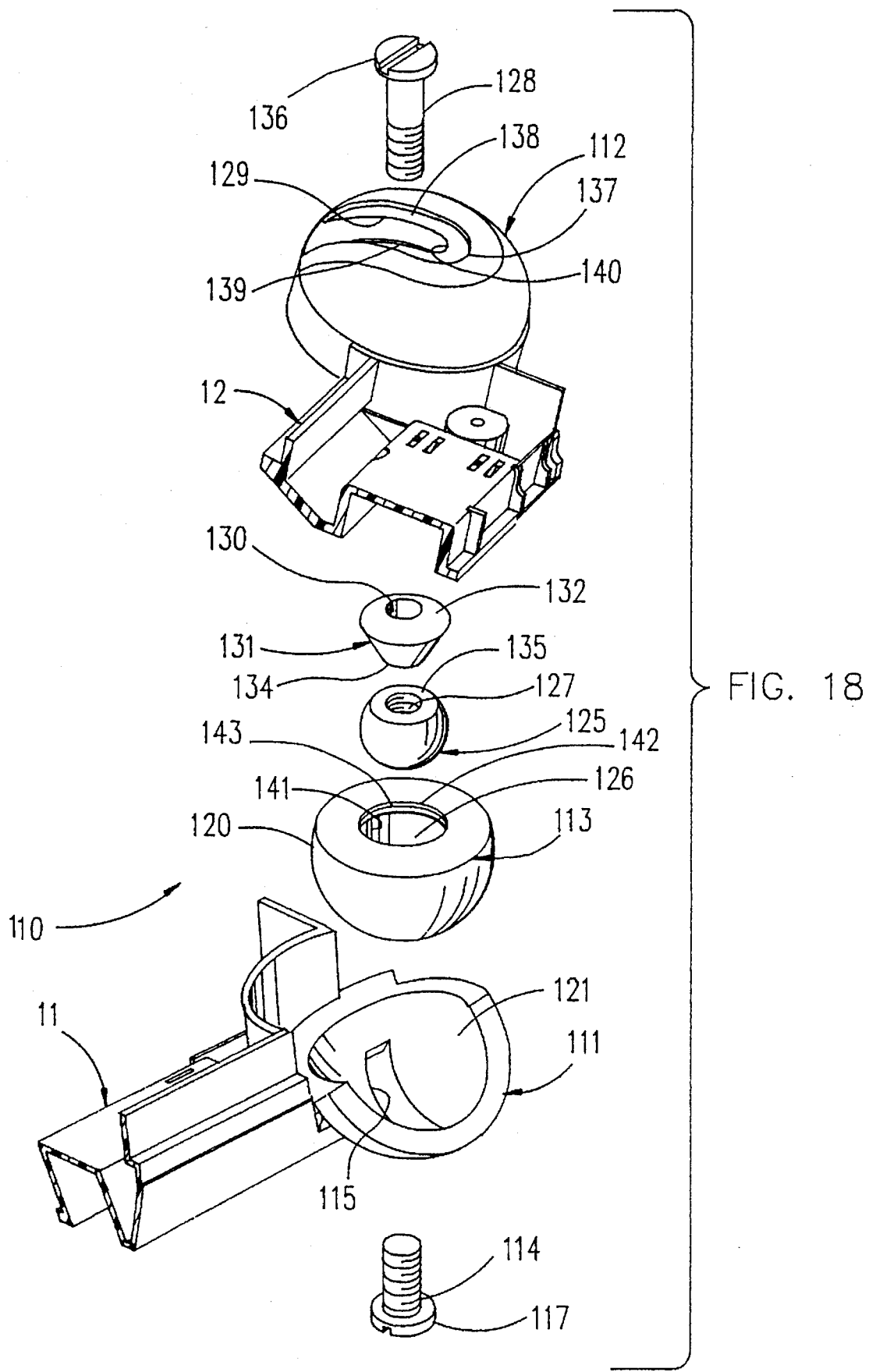
FIG. 18 is a exploded perspective view of another embodiment of a connector connecting the two segments of the keyboard to each other and taken from the top of the connector.

Referring to FIG. 18, there is shown a connector 110 for connecting the left segment 11 and the right segment 12 to each other. The connector 110 is utilized instead of the connector 14 (see FIG. 1).

The connector 110 (see FIG. 18) includes a bottom socket 111, which is the same as the bottom socket 66 (see FIG. 8) of the connector 14, and a top socket 112 (see FIG. 18), which is the same as the top socket 67 (see FIG. 8) of the connector 14. A spherical portion 113 (see FIG. 18), which is larger than a hemisphere but less than a sphere, is attached to the bottom socket 111 by a screw 114.

Figure 19:
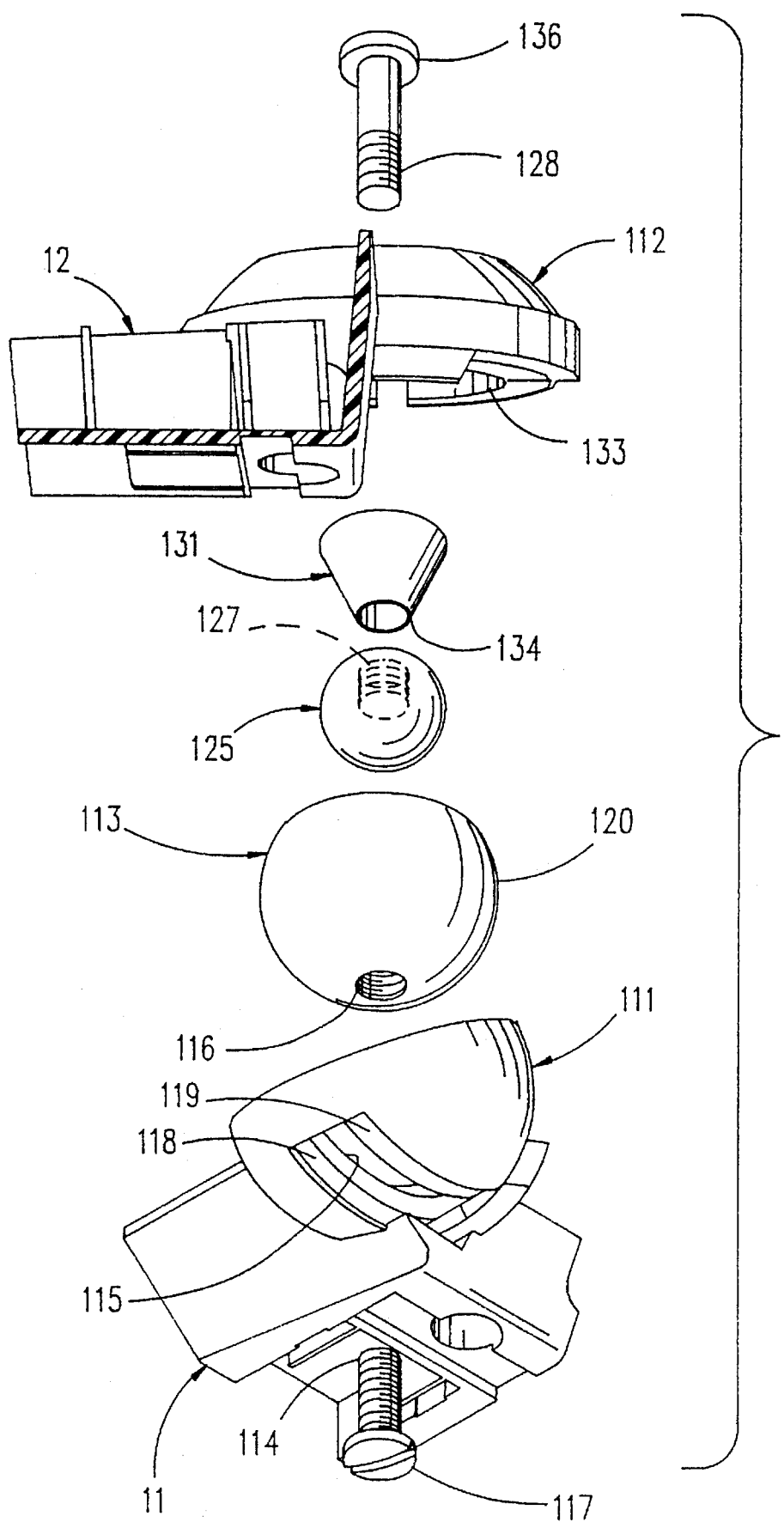
FIG. 19 is an exploded perspective view of the connector of FIG. 18 and taken from the bottom of the connector.

The screw 114 extends through an arcuate slot 115 in the bottom socket 111 and into a tapped hole 116 (see FIG. 19) at the lowermost portion of the spherical portion 113. The screw 114 has its head 117 bear against tracks 118 and 119 on opposite sides of the arcuate slot 115. Thus, the spherical portion 113 is precisely located within the bottom socket 111 so that the spherical portion 113 has its outer surface 120 bear against an inner spherical surface 121 (see FIG. 18) of the bottom socket 111.

The top socket 112 supports a ball 125 for disposition within a recess 126 in the spherical portion 113 to releasably connect the top socket 112 and the bottom socket 111 to each other. The ball 125 has a tapped hole 127 to receive a screw 128, which extends through an arcuate slot 129 in the top socket 112 and a passage 130 in a collar 131.

The collar 131 has a conical shape. The collar 131 has a curved upper surface 132, which is formed with the same radius of curvature as the radius of curvature of an inner spherical surface 133 (see FIG. 19) of the top socket 112 to provide a good bearing surface therebetween. Thus, the curved upper surface 132 (see FIG. 18) of the collar 131 engages the inner spherical surface 133 (see FIG. 19) of the top socket 112.

The collar 131 has a bottom flat surface 134 engaging a top flat surface 135 (see FIG. 18) of the ball 125. The screw 128 has its head 136 engage an arcuate end 137 of a pair of tracks 138 and 139, which are on opposite sides of the arcuate slot 129. Depending on the tolerances in forming the top socket 112, the screw 128 may engage an arcuate end 140 of the arcuate slot 129 rather than the head 136 engage the arcuate end 137 of the tracks 138 and 139. This location of the screw 128 insures that the screws 114 and 128 are aligned with each other and in a vertical plane.

Figure 20:
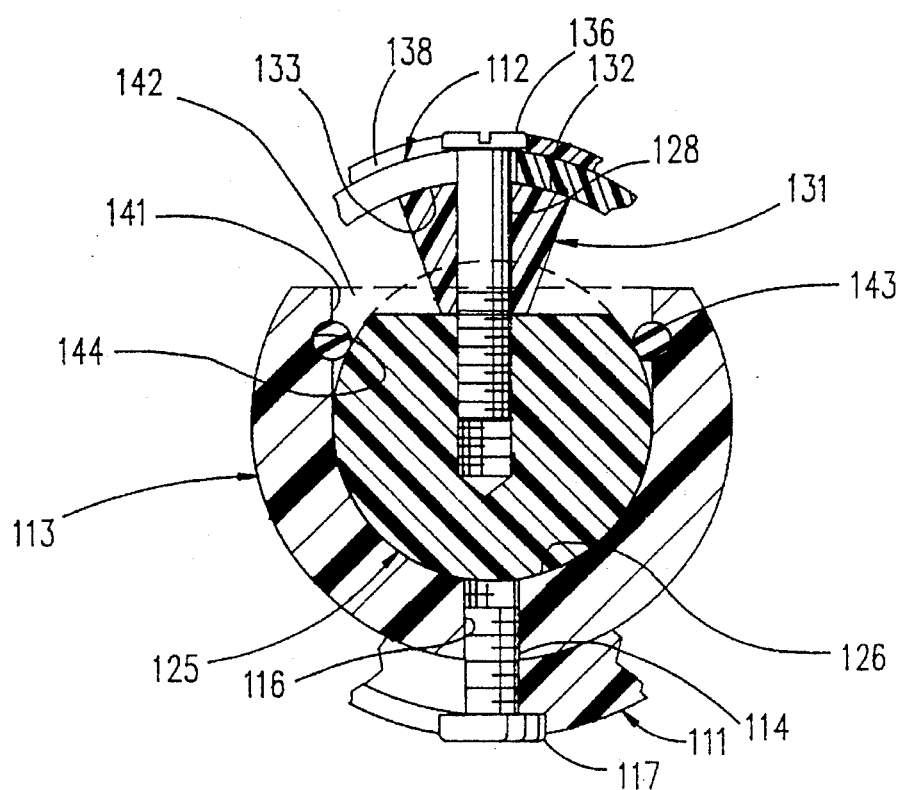
FIG. 20 is an enlarged fragmentary sectional view of a portion of the connector of FIGS. 18 and 19.

As shown in FIG. 20, the recess 126 in the spherical portion 113 is formed on a radius of curvature in its lower hemisphere and has a vertical or straight portion 141, which has a circular cross section as shown in FIG. 18, extending therefrom to its entrance opening 142. The vertical or straight portion 141 of the recess 126 has an O-ring 143 (see FIG. 20) mounted in a groove 144 therein. The O-ring 143 protrudes slightly inwardly beyond the vertical or straight portion 141 of the recess 126.

The O-ring 143 is located so that it will hold the ball 125 within the recess 126 when the ball 125 is inserted into the recess 126 through the entrance opening 142 in the spherical portion 113 for disposition within the recess 126. When the ball 125 is inserted, the ball 125 moves past the O-ring 143, which has sufficient resiliency to enable the ball 125 to pass. When it is desired to remove the ball 125 from the recess 126 in the spherical portion 113, exertion of an upward force on the ball 125 will overcome the resiliency of the O-ring 143 and allow the ball 125 to be removed from its connection to the spherical portion 113.

The connector 110 (see FIG. 18) allows the left segment 11 and the right segment 12 to have a maximum rotation therebetween in a horizontal (X–Y) plane about the vertical axis, defined by the screws 114 and 128, for 90°. Stopping of the 90° rotation in the horizontal (X–Y) plane is in the same manner as the connector 14 (see FIG. 1). That is, the upper socket 112 (see FIG. 18) has a stop (not shown), which corresponds to the stop 94 (see FIG. 10) on the upper socket 67, for engaging the rear wall 95 (see FIG. 4) of the top 17 of the left segment 11.

When the ball 125 (see FIG. 20) is disposed within the recess 126 in the spherical portion 113 and retained therein by the O-ring 143, the center of the ball 125 and the center of the spherical portion 113 are at the same position. This enables movement of the ball 125 relative to the spherical portion 113 and vice versa.

As a result of the centers of the spherical portion 113 and the ball 125 being at the same position, each of the left segment 11 (see FIG. 18) and the right segment 12 also may be tilted with respect to the other in a vertical plane, which is perpendicular to the horizontal plane in which the segments 11 and 12 rotate. The total tilt is 40° with each of the left segment 11 (see FIG. 18) and the right segment 12 tilted a maximum of 20° relative to a support surface.

The tilting of each of the left segment 11 and the right segment 12 is controlled by engagement of the collar 131 (see FIG. 20), which has its lower end disposed within the entrance opening 142, with the upper end of the vertical portion 141 of the recess 126.

Because the connector 110 (see FIG. 18) does not lock the segments 11 and 12 to each other as the connector 14 (see FIG. 1) does, it is necessary to separately support the left segment 11 when it is tilted or the right segment 12 when it is tilted. Accordingly, it is necessary to replace the pivotally mounted supports 37 (see FIG. 15) on each of the first segment 11 (see FIG. 18) and the second segment 12 with three pivotally mounted supports 150 (see FIG. 21). The pivotally mounted supports 150 are disposed at the same positions on the left segment 11 (see FIG. 6) and the right segment 12 (see FIG. 7) as the pivotally mounted supports 37.

The pivotally mounted support 150 is shown disposed in FIG. 21 in the recess 39. However, the same pivotally mounted support 150 is disposed in each of the recesses 35 (see FIG. 6) but all reference to FIG. 21 will be to the recess 39.

As shown in FIG. 21, each of the pivotally mounted supports 150 includes a pair of substantially parallel brackets 152 and 153 extending substantially perpendicular from the wall 43' of the recess 39. The brackets 152 and 153 have inner cylindrical studs 154 and 155, respectively, to pivotally support a short leg 156.

The short leg 156 has an opening 157 in a first split side 158, which is sufficiently flexible to enable the opening 157 to fit over the inner cylindrical stud 155 of the bracket 153. The short leg 156 has a second opening 159, which is similarly formed in a second split side 159', to fit over the inner cylindrical stud 154 on the bracket 152.

The short leg 156 has a recess or cavity 160 formed in its inner surface 161 and extending longitudinally for a substantial length of the short leg 156. The short leg 156 has a recess or cavity 162 (see FIG. 23) in its end and within which is disposed a rubber foot or plug 163. As shown in FIG. 23, the rubber foot 163 extends beyond the end of the short leg 156 so that only the rubber foot 163 engages the support surface. The rubber foot 163 is retained within the recess 162 by a suitable adhesive.

The pivotally mounted support 150 (see FIG. 21) includes a long leg 164, which has the short leg 156 nested therein when the legs 156 and 164 are disposed within the recess 39. The long leg 164 has an opening 165 in a first split side 166, which is sufficiently flexible to enable the opening 165 to fit over an outer cylindrical stud 167 on the bracket 153. The bracket 152 has a similar outer cylindrical stud (not shown) to receive an opening 169 in a second split side 170 of the long leg 164. Thus, the long leg 164 is pivotally mounted on the same pivot axis as the short leg 156.

The long leg 164 has a threaded passage 171 in a portion 171' adjacent its end. The threaded passage 171 is aligned with the recess 160 in the inner surface 161 of the short leg 156 when the legs 156 and 164 are in their inoperative or rest positions.

When the short leg 156 and the long leg 164 are in their inoperative or rest positions, a screw 172, which has a rubber head 173 on its end, is threaded into the threaded passage 171 and into the recess 160 in the short leg 156. The fully retracted position of the screw 172 is when the rubber head 173 engages a slot 174 in the end of the long leg 164. When the long leg 164 is pivoted to its support position, the rubber head 173 always engages the support surface irrespective of the position of the screw 172 in the long leg 164.

As previously mentioned with respect to the pivotally mounted support 37 (see FIG. 15), use of the short leg 46 of each of the two pivotally mounted supports 37, adjacent the abutting surface 15 (see FIG. 1) of the left segment 11 or the abutting surface 16 of the right segment 12, enables the segment 11 or 12 to be tilted 6° while use of the long leg 52 (see FIG. 15) produces a tilt of 12°. The short leg 156 (see FIG. 21) of the pivotally mounted support 150 similarly tilts the left segment 11 (see FIG. 1) or the right segment 12 at an angle of 6°. When the screw 172 (see FIG. 21) is fully retracted into the long leg 164 so that the rubber head 173 is positioned within the slot 174 in the end of the long leg 164 and protrudes slightly therebeyond, the long leg 164 also supports the left segment 11 (see FIG. 1) or the right segment 12 at 12° to the support surface. Extension of the screw 172 (see FIG. 21) to its maximum, which is with the screw 172 fully supported within the threaded passage 171, increases the tilt angle to 20°.

Accordingly, the left segment 11 (see FIG. 1) or the right segment 12 can be tilted only at 6° and any angle from 12° to 20°. This is because the pivotally mounted supports 150 (see FIG. 21) provide the only support for the left segment 11 (see FIG. 1) or the right segment 12 in any position to which it is moved because the connector 110 (see FIG. 18) does not lock the left segment 11 and the right segment 12 to each other.

The use of the pivotally mounted supports 150 (see FIG. 21) still produces the slope angles of 5°, 11°, and 17° as previously discussed with respect to the pivotally mounted supports 37 (see FIG. 15). The slope of 17° is obtained with the screw 172 (see FIG. 21) fully retracted into the long leg 164 so that the rubber head 173 is disposed within the slot 174 in the end of the long leg 164. Full extension of the screw 172 produces a maximum slope angle of 25° with any angle between 17° and 25° being obtainable depending upon the amount of extension of the rubber head 173 from the end of the long leg 164. These slope positions of the left segment 11 (see FIG. 1) or the right segment 12 are obtained through using only the two rear pivotally mounted supports 150 (see FIG. 21) on either the left segment 11 (see FIG. 1) or the right segment 12.

Thus, the pivotally mounted supports 150 are necessary with the connector 110 (see FIG. 18) to hold the left segment 11 or the right segment 12 in any tilt position to which it is moved. Of course, the left segment 11 or the right segment 12 could not be continuously moved to have a tilt angle from 0° to 20° but can only have a tilt angle of 6° or any angle between 12° and 20°.

When the left segment 11 (see FIG. 1) or the right segment 12 has its rear end raised upwardly with respect to its front end by the two rear pivotally mounted supports 150 (see FIG. 21) in the manner shown in FIG. 17 for the right segment 12 when the pivotally mounted supports 37 are employed, more slope angles are obtainable than with the use of the pivotally mounted supports 37 (see FIG. 15). This is because the slope angle can vary from 17° to 25° with the pivotally mounted supports 150 (see FIG. 21) due to the screw 172 being movable whereas the slope angle can only be a maximum of 17° with the pivotally mounted supports 37 (see FIG. 15) in addition to the other two slope angles of 5° and 11°. The two slope angles of 5° and 11° also are obtainable with the pivotally mounted supports 150 (see FIG. 21).

When the short leg 156 is pivoted from its inoperative or rest position to its support position, a cam surface 175 on each side of the short leg 156 initially engages the vertical wall 43' above the central portion of the ledge 63. As pivoting continues, the two cam surfaces 175 spring away from the wall 43' as they pass over the central portion of the ledge 63. Then, the cam surfaces 175 engage the bottom of the central portion of the ledge 63 so that the central portion of the ledge 63 functions as a detent for the short leg 156.

When the long leg 164 is pivoted from its inoperative or rest position to its support position, a cam surface 176 on each side of the long leg 164 initially engages the vertical wall 43' above the outer portions of the ledge 63. As pivoting continues, the two cam surfaces 176 spring away from the wall 43' as they pass over the outer portions of the ledge 63. Then, the cam surfaces 176 engage the bottom of the outer portions of the ledge 63 so that the outer portions of the ledge 63 function as a detent for the long leg 164.

It should be understood that the pivotally mounted supports 150 may be employed in place of the pivotally mounted supports 37 (see FIG. 15) when the connector 14 (see FIG. 1) is utilized to connect the segments 11 and 12 to each other. The use of the pivotally mounted supports 150 (see FIG. 21) permits greater angles of tilt when the segments 11 (see FIG. 1) and 12 are separated from each other.

It is not necessary that the spherical portion 113 (see FIG. 20) have a spherical outer surface or that the recess 126 have its lower portion slightly greater than a hemisphere. The outer surface of the spherical portion 113 may have any shape provided that the bottom socket 111 has its inner surface changed to conform with the outer surface of the spherical portion 113. This is because the outer shape of the spherical portion 113 is not employed for any relative movement between the bottom socket 111 (see FIG. 18) and the top socket 112. Instead, all of the movement is controlled by the ball 125 (see FIG. 20) moving within the recess 126 in the spherical portion 113.

The lower portion of the recess 126 does not have to be a hemisphere. Instead, the recess 126 could be a cylinder with a circular cross section, for example.

Furthermore, the top socket 112 (see FIG. 18) may have a crowned cover thereover for aesthetic purposes. With the crowned cover, the screw 128 would be replaced by a threaded stud extending into a tapped hole in the bottom surface of the crowned cover.

Figure 24:
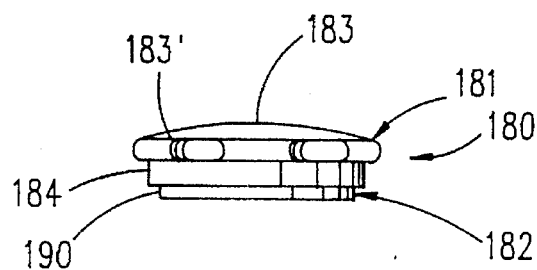
FIG. 24 is a side elevational view of another embodiment of a knob for use with the connector of FIGS. 8 and 9.

Referring to FIG. 24, there is shown a knob 180 for use with the connector 14 (see FIG. 8) in place of the knob 83. The knob 180 (see FIG. 24) has an upper gripping portion 181 and an insert 182.

The upper gripping portion 180 has a crowned top 183 and scallops 183' on the circumference of the crowned top 183 to enable gripping. The crowned top 183 is formed integral with a bottom cylinder 184.

Figure 26:
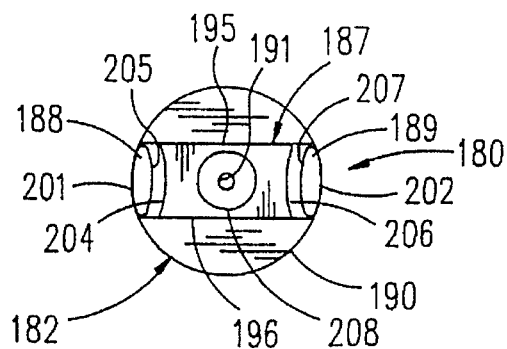
FIG. 26 is a top plan view of an insert of the knob of FIG. 24.
Figure 25:
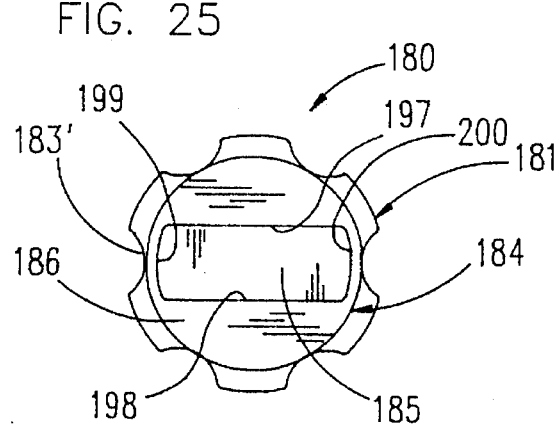
FIG. 25 is a bottom plan view of an upper gripping portion of the knob of FIG. 24.
Figure 27:
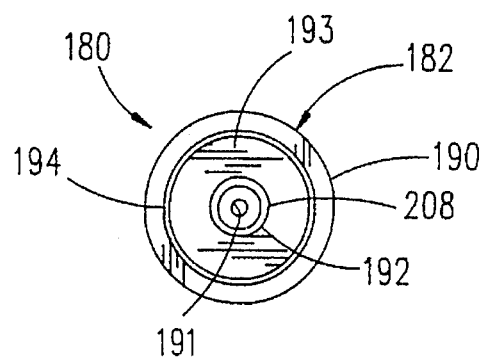
FIG. 27 is a bottom plan view of the insert of FIG. 26.

As shown in FIG. 25, the bottom cylinder 184 of the upper gripping portion 181 has a recess 185 in its bottom surface 186 to receive a main portion 187 (see FIG. 26), an end portion 188, and an end portion 189 extending upwardly from a cylindrical portion 190 of the insert 182. The cylindrical portion 190 has a tapped hole 191 (see FIG. 27) extending through an inner hub 192, which protrudes from its bottom surface 193, and through the main portion 187 (see FIG. 26). The tapped hole 191 receives the upper threaded end of the shaft 69 (see FIG. 8) in the same manner as the threaded hole 82 (see FIG. 9) in the knob 83 receives the upper end of the threaded shaft 69.

The bottom surface 193 (see FIG. 27) of the cylindrical portion 190 of the insert 182 also has a spherical clamping surface 194. The spherical clamping surface 194 functions in the same manner as the spherical clamping surface 86 (see FIG. 9) of the knob 83.

When the main portion 187 (see FIG. 26) and the end portions 188 and 189 are disposed within the recess 185 (see FIG. 25), the main portion 187 (see FIG. 26) of the insert 182 has a pair of substantially parallel walls 195 and 196 bearing against substantially parallel walls 197 (see FIG. 25) and 198, respectively, of the recess 185 in the bottom cylinder 184 of the knob 180.

The recess 185 has curved end walls 199 and 200 joining the substantially parallel walls 197 and 198 at each end. When the main portion 187 (see FIG. 26) and the end portions 188 and 189 are disposed within the recess 185 (see FIG. 25), the curved end wall 199 contacts an outer curved surface 201 (see FIG. 26) of the end portion 188 of the insert 182, and the curved end wall 200 (see FIG. 25) engages an outer curved surface 202 (see FIG. 26) of the end portion 189 of the insert 182.

Thus, the insert 182 is disposed within the recess 185 (see FIG. 25). This permits turning of the shaft 69 (see FIG. 9) by rotation of the knob 180 (see FIG. 24) when desired.

It should be understood that the inner hub 192 (see FIG. 27) of the insert 182 rides within the tracks 87 (see FIG. 8) and 88 in the same manner as the inner hub 85 (see FIG. 9) of the knob 83.

If a user cannot obtain Sufficient torque on the knob 180 (see FIG. 24) to turn the knob 180 to tighten the knob 180 against the top socket 67 (see FIG. 9), the upper gripping portion 181 (see FIG. 24) can be lifted upwardly so that it no longer fits over the insert 182. Then, the upper gripping portion 181 has one of the curved end walls 199 (see FIG. 25) and 200 disposed between a curved end surface 204 (see FIG. 26) of the main portion 187 and an inner curved end surface 205 of the end portion 188 of the insert 182 or between a curved end surface 206 of the main portion 187 and an inner curved surface 207 of the end portion 189 of the insert 182.

Figure 28:
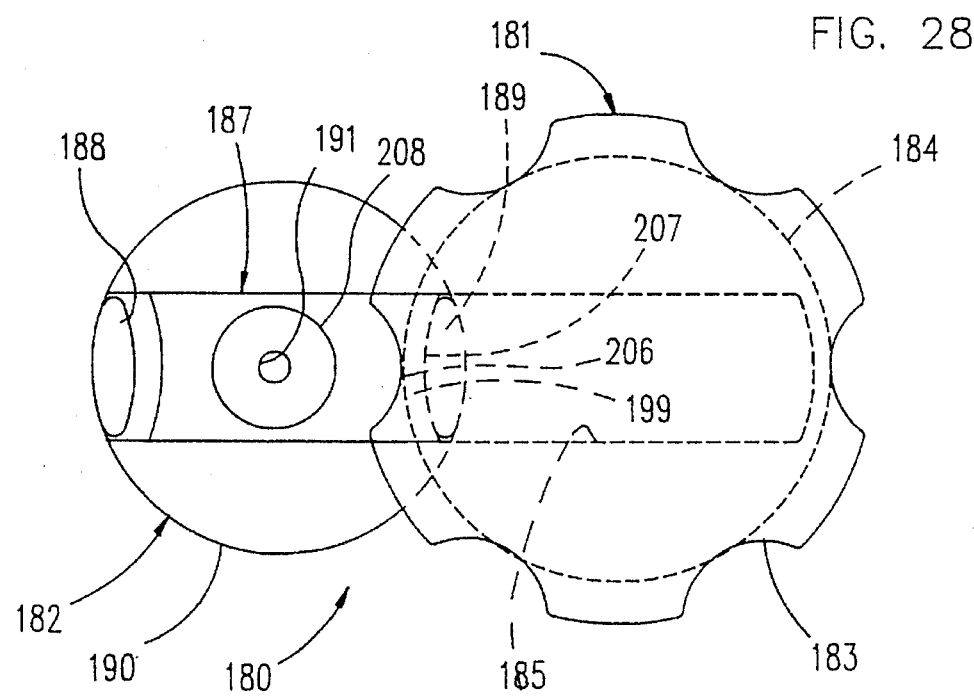
FIG. 28 is an enlarged top plan view of the upper gripping portion and the insert with the upper gripping portion separated from the insert, not symmetrical with the insert, and utilized to increase the torque for turning the insert.

In FIG. 28, the curved end wall 199 of the recess 185 is disposed between the curved end surface 206 of the main portion 187 of the insert 182 and the inner curved surface 207 of the end portion 189. This enables a user to exert a greater torque on the shaft 69 (see FIG. 9) disposed within the tapped hole 191 (see FIG. 28) in the main portion 187 of the insert 182.

The upper gripping portion 181 (see FIG. 24) of the knob 180 is preferably formed of a suitable plastic. The insert 182 is preferably formed of a combination of a metal portion 208 (see FIG. 26) and a glass filled plastic portion. The metal portion 208 of the insert 182 would include at least the tapped hole 191.

An advantage of this invention is that two keyboard segments can be easily separated when desired. Another advantage of this invention is that the two keyboard segments, when connected to each other, are held in any tilted position. A further advantage of this invention is that the two keyboard segments can be separated from each other a maximum of 90° in the plane of support and 90° in the plane perpendicular to the support plane in one embodiment and 40° in the other embodiment. Still another advantage of this invention is that each keyboard segment, irrespective of whether it is connected to the other or separate, can be disposed in various tilted positions relative to its support surface.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A keyboard including:

first and second segments, each of said first segment and said second segment having a plurality of keys;

each of said first segment and said second segment having an abutting surface;

connecting means for connecting said first segment and said second segment to each other for enabling relative movement between said first segment and said second segment, for holding said first segment and said second segment in any position to which first segment and said second segment are moved relative to each other including holding said abutting surfaces of said first segment and said second segment in abutting relation, and for enabling disconnection of said first segment and said second segment from each other;

and said connecting means including:

a ball;

a first element on one of said first segment and said second segment having a partial spherical surface for engaging a portion of said ball;

a second element on the other of said first segment and said second segment having a partial spherical surface for engaging another portion of said ball;

and releasably connecting means for releasably connecting said first element, said ball, and said second element to each other to retain each of said first segment and said second segment in any position to which each of said first segment and said second segment is moved.

2. The keyboard according to claim 1 including:

each of said first segment and said second segment having three pivotally mounted support means disposed on its bottom for supporting each of said first segment and said second segment, each of said three pivotally mounted support means being separately movable between a rest position and a support position in which said pivotally mounted support means extends beyond the plane of the bottom of said first segment or said second segment on which said pivotally mounted support means is pivotally mounted for at least one selected length;

two of said three pivotally mounted support means on each of said first segment and said second segment being disposed adjacent the rear of each of said first segment and said second segment;

and a third of said three pivotally mounted support means on each of said first segment and said second segment being disposed adjacent said abutting surface of each of said first segment and said second segment and the front of each of said first segment and said second segment.

3. The keyboard according to claim 2 in which each of said pivotally mounted support means includes:

a first pivotally mounted support;

and a second pivotally mounted support having a greater length than said first pivotally mounted support, only one of said first pivotally mounted support and said second pivotally mounted support being utilized at any time to raise the portion of said first segment or said second segment to which said pivotally mounted support means is attached.

4. The keyboard according to claim 3 in which said second pivotally mounted support has means for enabling nesting of said first pivotally mounted support within said second pivotally mounted support when said first pivotally mounted support and said second pivotally mounted support are in their rest positions.

5. The keyboard according to claim 4 including:

extension means supported by said second pivotally mounted support for selectively increasing the effective length of said second pivotally mounted support;

and said first pivotally mounted support having receiving means for receiving said extension means when said extension means is retracted within said second pivotally mounted support and said first pivotally mounted support and said second pivotally mounted support are in their rest positions.

6. The keyboard according to claim 2 in which:

each of said three pivotally mounted support means is disposed adjacent a different corner of each of said first segment and said second segment on which said three pivotally mounted support means are mounted;

and said two pivotally mounted support means have the same pivot axis and said third pivotally mounted support means has its pivot axis perpendicular to the pivot axis of said two pivotally mounted support means.

7. The keyboard according to claim 6 in which each of said pivotally mounted support means includes:

a first pivotally mounted support;

and a second pivotally mounted support having a greater length than said first pivotally mounted support, only one of said first pivotally mounted support and said second pivotally mounted support being utilized at any time to raise the portion of said first segment or said second segment to which said pivotally mounted support means is attached.

8. The keyboard according to claim 1 in which said releasably connecting means includes:

a shaft;

each of said first element, said ball, and said second element having enabling means for enabling said shaft to extend therethrough;

said shaft having a head on one end to engage said second element;

and a knob attached to the other end of said shaft and engaging said first element to hold said first segment and said second segment in any position to which said first segment and said second segment are moved.

9. The keyboard according to claim 8 in which:

said first element has an outer spherical surface;

and said knob has a spherical surface for engaging said outer spherical surface of said first element to hold said first segment and said second segment in any position to which said first segment and said second segment are moved.

10. The keyboard according to claim 9 in which said knob and said first element have cooperating means for cooperating with each other to prevent separation of said knob and said first element when said spherical surface of said knob is engaging said outer spherical surface of said first element.

11. The keyboard according to claim 10 in which said cooperating means includes:

said first element having a track in its outer surface;

and a circular, cylindrical projection extending from said knob for disposition in said track.

12. The keyboard according to claim 11 in which:

said second element has a spherical outer surface;

and said enabling means of said second element includes:
an arcuate slot in said spherical outer surface of said second element extending for a selected arcuate length to have said shaft extend therethrough;
and a track in said spherical outer surface of said second element on opposite sides of said arcuate slot.

13. The keyboard according to claim 12 in which said knob includes:

an upper gripping means;

an insert attached to the other end of said shaft and engaging said first element to hold said first segment and said second segment in any position to which said first segment and said second segment are moved;

and said upper gripping means having receiving means for receiving said insert to enable said upper gripping means and said insert to turn together.

14. The keyboard according to claim 13 in which said upper gripping means and said insert have cooperating means when said receiving means in said upper gripping means is not symmetrical with respect to said shaft to increase the distance of said upper gripping means from said shaft to increase the torque applied to said insert.

15. The keyboard according to claim 14 in which:

said upper gripping means has a recess having a pair of substantially parallel side walls and a curved wall at each end of said substantially parallel side walls joining the ends of said substantially parallel side walls;

said insert has a pair of diametrically disposed curved slots formed on substantially the same radius of curvature as each of said pair of curved walls of said recess in said upper gripping means;

and said cooperating means of said upper gripping means and said insert include one of said curved walls of said recess and one of said curved slots in said insert.

16. The keyboard according to claim 10 in which said knob includes:

an upper gripping means;

an insert attached to the other end of said shaft and engaging said first element to hold said first segment and said second segment in any position to which said first segment and said second segment are moved;

and said upper gripping means having receiving means for receiving said insert to enable said upper gripping means and said insert to turn together.

17. The keyboard according to claim 16 in which said upper gripping means and said insert have cooperating means when said receiving means in said upper gripping means is not symmetrical with respect to said shaft to increase the distance of said upper gripping means from said shaft to increase the torque applied to said insert.

18. The keyboard according to claim 17 in which:

said upper gripping means has a recess having a pair of substantially parallel side walls and a curved wall at each end of said substantially parallel side walls joining the ends of said substantially parallel side walls;

said insert has a pair of diametrically disposed curved slots formed on substantially the same radius of curvature as each of said pair of curved walls of said recess in said upper gripping means;

and said cooperating means of said upper gripping means and said insert include one of said curved walls of said recess and one of said curved slots in said insert.

19. The keyboard according to claim 1 in which said first segment and said second segment are substantially the same size.

20. The keyboard according to claim 1 in which said abutting surfaces of said first segment and said second segment are straight.

21. A keyboard including:

first and second segments, each of said first segment and said second segment having a plurality of keys;

connecting means for connecting said first segment and said second segment to each other for enabling relative movement between said first segment and said second segment and for enabling disconnection of said first segment and said second segment from each other;

and said connecting means including:
a first element on said first segment;
a second element on said second segment;
a third element disposed between said first element and said second element;
said first element having cooperating means for cooperating with said third element;
releasably connecting means for releasably connecting said first element and said second element to each other and at least said first element and said third element;
said cooperating means of said first element being a ball supported by said first element;
said third element being fixed to said second element;
said third element having a recess to receive said ball;
and said third element having retaining means for releasably retaining said ball in said recess in said third element.

22. The keyboard according to claim 21 in which said releasably connecting means includes said ball of said first element, said recess in said third element, and said releasably retaining means.

23. The keyboard according to claim 21 in which:

said recess in said third element has its lower portion formed as a hemisphere;

and said ball and said recess in said third element have a common center when said ball is disposed in said recess in said third element.

24. A keyboard including:

first and second segments, each of said first segment and said second segment having a plurality of keys;

connecting means for connecting said first segment and said second segment to each other for enabling relative movement between said first segment and said second segment and for enabling disconnection of said first segment and said second segment from each other;

and said connecting means including:
a first element on said first segment;
a second element on said second segment;
a third element disposed between said first element and said second element;

said first element having cooperating means for cooperating with said third element;

releasably connecting means for releasably connecting said first element and said second element to each other and at least said first element and said third element;

said third element having an outer spherical surface;

said first element having a partial spherical surface for engaging a portion of said outer spherical surface of said third element;

said second element having a partial spherical surface for engaging another portion of said outer spherical surface of said third element;

and said releasably connecting means including means for releasably connecting said first element, said third element, and said second element to each other to retain each of said first segment and said second segment in any position to which each of said first segment and said second segment is moved.

25. A keyboard including:

first and second segments, each of said first segment and said second segment having a plurality of keys;

each of said first segment and said second segment having an abutting surface;

connecting means for connecting said first segment and said second segment to each other for enabling relative movement between said first segment and said second segment, for holding said first segment and said second segment in any position to which first segment and said second segment are moved relative to each other including holding said abutting surfaces of said first segment and said second segment in abutting relation, and for enabling disconnection of said first segment and said second segment from each other;

each of said first segment and said second segment having three pivotally mounted support means disposed on its bottom for supporting each of said first segment and said second segment, each of said three pivotally mounted support means being separately movable between a rest position and a support position in which said pivotally mounted support means extends beyond the plane of the bottom of said first segment or said second segment on which said pivotally mounted support means is pivotally mounted for at least one selected length;

two of said three pivotally mounted support means on each of said first segment and said second segment being disposed adjacent the rear of each of said first segment and said second segment;

and a third of said three pivotally mounted support means on each of said first segment and said second segment being disposed adjacent said abutting surface of each of said first segment and said second segment and the front of each of said first segment and said second segment.

26. The keyboard according to claim 25 in which each of said pivotally mounted support means includes:

a first pivotally mounted support;

and a second pivotally mounted support having a greater length than said first pivotally mounted support, only one of said first pivotally mounted support and said second pivotally mounted support being utilized at any time to raise the portion of said first segment or said second segment to which said pivotally mounted support means is attached.

27. The keyboard according to claim 26 in which said second pivotally mounted support has means for enabling nesting of said first pivotally mounted support within said second pivotally mounted support when said first pivotally mounted support and said second pivotally mounted support are in their rest positions.

28. The keyboard according to claim 27 including:

extension means supported by said second pivotally mounted support for selectively increasing the effective length of said second pivotally mounted support;

and said first pivotally mounted support having receiving means for receiving said extension means when said extension means is retracted within said second pivotally mounted support and said first pivotally mounted support and said second pivotally mounted support are in their rest positions.

29. The keyboard according to claim 28 in which:

each of said three pivotally mounted support means is disposed adjacent a different corner of each of said first segment and said second segment on which said three pivotally mounted support means are mounted;

and said two pivotally mounted support means have the same pivot axis and said third pivotally mounted support means has its pivot axis perpendicular to the pivot axis of said two pivotally mounted support means.

30. The keyboard according to claim 25 in which:

each of said three pivotally mounted support means is disposed adjacent a different corner of each of said first segment and said second segment on which said three pivotally mounted support means are mounted;

and said two pivotally mounted support means have the same pivot axis and said third pivotally mounted support means has its pivot axis perpendicular to the pivot axis of said two pivotally mounted support means.

* * * * *